(12) United States Patent
Yun et al.

(10) Patent No.: US 10,869,319 B2
(45) Date of Patent: Dec. 15, 2020

(54) METHOD AND APPARATUS FOR CONTROLLING INTERFERENCE IN WIRELESS COMMUNICATION SYSTEM

(71) Applicant: Samsung Electronics Co., Ltd., Suwon-si (KR)

(72) Inventors: Yeohun Yun, Hwaseong-si (KR); Kyeongyeon Kim, Hwaseong-si (KR); Chanhong Kim, Suwon-si (KR); Jiyun Seol, Seongnam-si (KR); Ming Hoka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/068,266

(22) PCT Filed: Dec. 21, 2016

(86) PCT No.: PCT/KR2016/014969
§ 371 (c)(1),
(2) Date: Jul. 5, 2018

(87) PCT Pub. No.: WO2017/119637
PCT Pub. Date: Jul. 13, 2017

(65) Prior Publication Data
US 2019/0029026 A1 Jan. 24, 2019

(30) Foreign Application Priority Data
Jan. 5, 2016 (KR) .......... 10-2016-0000949

(51) Int. Cl.
*H04L 5/00* (2006.01)
*H04W 72/08* (2009.01)
(Continued)

(52) U.S. Cl.
CPC ......... *H04W 72/082* (2013.01); *H04J 11/003* (2013.01); *H04L 27/2602* (2013.01);
(Continued)

(58) Field of Classification Search
CPC ........... H04W 72/082; H04W 72/0453; H04W 88/08; H04W 88/02; H04L 27/2602;
(Continued)

(56) References Cited

U.S. PATENT DOCUMENTS 8,891,430 B1 * 11/2014 Sahin ................ H04L 27/00
370/312
8,908,796 B1 12/2014 Guvenkaya et al.
(Continued)

FOREIGN PATENT DOCUMENTS

EP 2437450 A1 4/2014
JP 2008099092 * 4/2008

*Primary Examiner* — Un C Cho
*Assistant Examiner* — Lalita W Pace
(74) *Attorney, Agent, or Firm* — Jefferson IP Law, LLP

(57) ABSTRACT

The disclosure relates to a pre-5th-Generation (5G) or 5G communication system to be provided for supporting higher data rates Beyond 4th-Generation (4G) communication system such as Long Term Evolution (LTE). The present disclosure relates to a $5^{th}$ generation (5G) or pre-5G communication system for supporting a higher data transmission rate beyond a 4th generation (4G) communication system such as long term evolution (LTE). A method for operating a base station in a wireless communication system, according to the present disclosure, comprises determining the window configuration to be applied to a transmission signal based on channel-related information of at least one UE; and transmitting control information comprising the window configuration to the at least one UE, wherein the window configuration comprises a length of each window to be
(Continued)

applied to each of at least one subband of a frequency band allocated to the transmission signal.

18 Claims, 30 Drawing Sheets

(51) Int. Cl.
*H04L 27/26* (2006.01)
*H04J 11/00* (2006.01)
*H04W 72/04* (2009.01)
*H04W 88/02* (2009.01)
*H04W 88/08* (2009.01)

(52) U.S. Cl.
CPC ....... *H04W 72/0453* (2013.01); *H04L 5/0053* (2013.01); *H04L 5/0057* (2013.01); *H04L 5/0073* (2013.01); *H04W 88/02* (2013.01); *H04W 88/08* (2013.01)

(58) Field of Classification Search
CPC ... H04L 5/0073; H04L 5/0057; H04L 5/0053; H04J 11/003; H04J 11/0023
See application file for complete search history.

(56) References Cited

U.S. PATENT DOCUMENTS

| | | | |
|---|---|---|---|
| 9,780,985 B1* | 10/2017 | Tom | H04L 27/2614 |
| 2005/0053121 A1* | 3/2005 | Lakkis | H04L 1/06 |
| | | | 375/130 |
| 2006/0140289 A1* | 6/2006 | Mandyam | H04B 1/707 |
| | | | 375/260 |
| 2006/0239367 A1* | 10/2006 | Wilhelmsson | H04L 25/03006 |
| | | | 375/260 |
| 2010/0067480 A1* | 3/2010 | Wang | H04B 7/0413 |
| | | | 370/330 |
| 2010/0074205 A1* | 3/2010 | Papasakellariou | H04L 5/0007 |
| | | | 370/329 |
| 2010/0184380 A1* | 7/2010 | Zhou | H04L 27/2626 |
| | | | 455/63.1 |
| 2011/0007779 A1* | 1/2011 | Nanri | H04B 1/715 |
| | | | 375/133 |
| 2011/0274187 A1 | 11/2011 | Huang et al. | |
| 2012/0033751 A1 | 2/2012 | Sathananthan et al. | |
| 2012/0230376 A1* | 9/2012 | Yokomakura | H04L 25/03828 |
| | | | 375/219 |
| 2012/0243503 A1* | 9/2012 | Mochida | H04W 28/04 |
| | | | 370/330 |
| 2012/0250558 A1 | 10/2012 | Chung et al. | |
| 2013/0016765 A1* | 1/2013 | Park | H04L 25/03 |
| | | | 375/224 |
| 2015/0156045 A1* | 6/2015 | Lee | H04L 27/2613 |
| | | | 375/260 |
| 2015/0256972 A1* | 9/2015 | Markhovsky | H04W 4/90 |
| | | | 455/456.1 |
| 2015/0372843 A1* | 12/2015 | Bala | H04L 25/03834 |
| | | | 375/295 |
| 2015/0373572 A1* | 12/2015 | Sahin | H04W 72/1231 |
| | | | 370/252 |
| 2016/0211999 A1* | 7/2016 | Wild | H04L 27/264 |

* cited by examiner

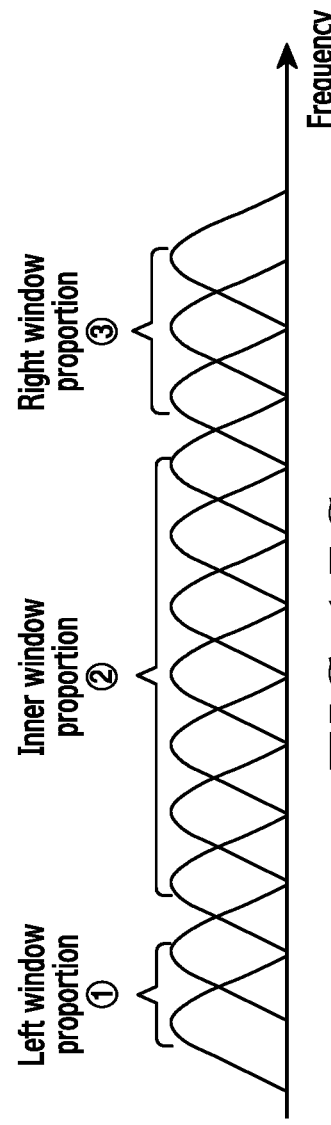
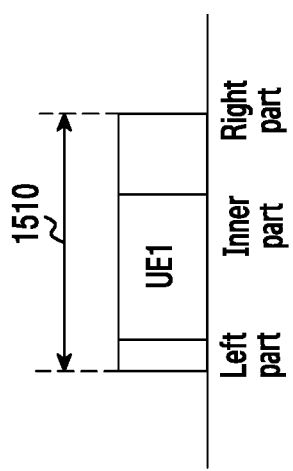
FIG.15A
FIG.15B
FIG.15C

Table 1610:

| Index | Proportions of multiple windows (in allocated bands) | | | Window length | | |
|---|---|---|---|---|---|---|
| | Left | Inner | Right | Left | Inner | Right |
| 1 | 10% | 80% | 10% | 72 | 8 | 72 |
| 2 | 20% | 60% | 20% | 72 | 8 | 72 |
| 3 | 40% | 60% | 0% | 72 | 8 | 72 |
| 4 | 0% | 60% | 40% | 72 | 8 | 72 |
| 5 | 30% | 40% | 30% | 72 | 8 | 72 |
| 6 | 15% | 40% | 45% | 72 | 8 | 72 |
| 7 | 45% | 40% | 15% | 72 | 8 | 72 |
| 8 | 0% | 40% | 60% | 72 | 8 | 72 |
| 9 | 60% | 40% | 0% | 72 | 8 | 72 |
| 10 | 40% | 20% | 40% | 72 | 8 | 72 |
| 11 | 20% | 20% | 60% | 72 | 8 | 72 |
| 12 | 60% | 20% | 20% | 72 | 8 | 72 |
| 13 | 0% | 20% | 80% | 72 | 8 | 72 |
| 14 | 80% | 20% | 0% | 72 | 8 | 72 |
| 15 | 10% | 80% | 10% | 72 | 8 | 36 |
| ... | | | | | | |

Table 1630:

| Index | Proportions of multiple windows (in allocated bands) | | | Window length | | |
|---|---|---|---|---|---|---|
| | Left | Inner | Right | Left | Inner | Right |
| 1 | 10% | 80% | 10% | 72 | 8 | 72 |
| 2 | 20% | 60% | 20% | 36 | 8 | 72 |
| 3 | 40% | 60% | 0% | 72 | 8 | 36 |
| 4 | 0% | 60% | 40% | 18 | 8 | 18 |
| 5 | 30% | 40% | 30% | 18 | 8 | 36 |
| 6 | 15% | 40% | 45% | 36 | 8 | 18 |
| 7 | 45% | 40% | 15% | 27 | 8 | 72 |
| 8 | 0% | 40% | 60% | 72 | 8 | 27 |
| 9 | 60% | 40% | 0% | | | |
| 10 | 40% | 20% | 40% | | | |
| 11 | 20% | 20% | 60% | | | |
| 12 | 60% | 20% | 20% | | | |
| 13 | 0% | 20% | 80% | | | |
| 14 | 80% | 20% | 0% | | | |

FIG. 16

METHOD AND APPARATUS FOR CONTROLLING INTERFERENCE IN WIRELESS COMMUNICATION SYSTEM

TECHNICAL FIELD

The present disclosure relates to control of interference in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System.'

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As recent demand for wireless communication technology satisfying various service requirements increases, research for a 5G system satisfying the requirements is actively being conducted. In order to allow signals designed to support different services with limited frequency resources to coexist, controlling interference between different Radio Access Technologies (RATs) is necessary.

In the case of not only the different RATs but also a single wireless access technology, controlling interference is necessary to increase system performance in the situation in which there are asynchronous characteristics (for example, a frequency offset, a timing offset, and a Doppler effect in frequency and time domains to which a plurality of user equipments (UEs) is allocated), as in the uplink.

DETAILED DESCRIPTION OF THE INVENTION

Technical Problem

Accordingly, the present disclosure provides a method and an apparatus for controlling interference in a wireless communication system.

Embodiments of the present disclosure provide a method and an apparatus for configuring a window by a Base Station (BS) of a wireless communication system on the basis of channel-related information.

Embodiments of the present disclosure provide a method and an apparatus for applying a window to a signal to be transmitted by a UE in an uplink environment of a wireless communication system.

Embodiments of the present disclosure provide a method and an apparatus for applying a window to signals transmitted through different Radio Access Technologies (RATs) in a downlink environment of a wireless communication system.

Technical Solution

A method for operating a base station (BS) in a wireless communication system according to an embodiment of the present disclosure in order to achieve the above-described goal comprises: determining the window configuration to be applied to a transmission signal based on channel-related information of at least one UE; and transmitting control information comprising the window configuration to the at least one UE, wherein the window configuration comprises a length of each window to be applied to each of at least one subband of a frequency band allocated to the transmission signal.

A method for operating a UE in a wireless communication system according to an embodiment of the present disclosure comprises receiving control information comprising the window configuration to be applied to a transmission signal, the window configuration being determined based on channel-related information, wherein the window configuration comprises a length of each window to be applied to each of at least one subband of a frequency band allocated to the transmission signal.

A base station (BS) in a wireless communication system according to an embodiment of the present disclosure comprises: at least one processor configured to determine the window configuration to be applied to a transmission signal based on channel-related information of at least one UE; and a transceiver configured to transmit control information comprising the window configuration to the at least one UE, wherein the window configuration comprises a length of each window to be applied to each of at least one subband of a frequency band allocated to the transmission signal.

A UE in a wireless communication system according to an embodiment of the present disclosure comprises at least one transceiver configured to receive control information comprising the window configuration to be applied to a transmission signal, the window configuration being determined based on channel-related information, wherein the window configuration comprises a length of each window to be applied to each of at least one subband of a frequency band allocated to the transmission signal.

Advantageous Effects

According to an embodiment of the present disclosure, it is possible to effectively control interference with UEs allocated to adjacent bands by applying windows having different lengths to respective subcarriers of frequency bands to which the UEs are allocated in an uplink environment of a wireless communication system.

According to an embodiment of the present disclosure, it is possible to effectively control interference between different radio access technologies by differently configuring lengths of windows to be applied to frequency bands used by the respective different Radio Frequency Technologies (RATs) in a downlink environment of the wireless communication system.

BRIEF DESCRIPTION OF THE DRAWINGS

FIGS. 15A, 15B, and 15C schematically illustrate a proportion and a length of an applied window in a frequency spectrum of a signal transmitted by a UE;

FIG. 16 is a table showing proportions of subbands to which windows are applied in the frequency band allocated to the UE and window lengths corresponding to the respective subbands;

MODE FOR CARRYING OUT THE INVENTION

Hereinafter, the operational principle of the present disclosure will be described in detail with reference to the accompanying drawings. In describing various embodiments below, a detailed description of related known configurations or functions incorporated herein will be omitted if it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

Terms referring to control information, terms referring to signal attributes, terms referring to a means (for example, a window) for processing a signal, terms referring to a network entity, terms referring to messages, and terms referring to an element of a device, which are used in the following description, are examples for convenience of description. Accordingly, the present disclosure is not limited to the following terms, and other terms having the same technical meaning may be used.

For convenience of description, the present disclosure uses terms and names defined in the 3rd-Generation Partnership Project Long-Term Evolution (3GPP LTE) standard. However, the present disclosure is not limited to the terms and names, and may be equally applied to a system according to another standard.

Figure 1:
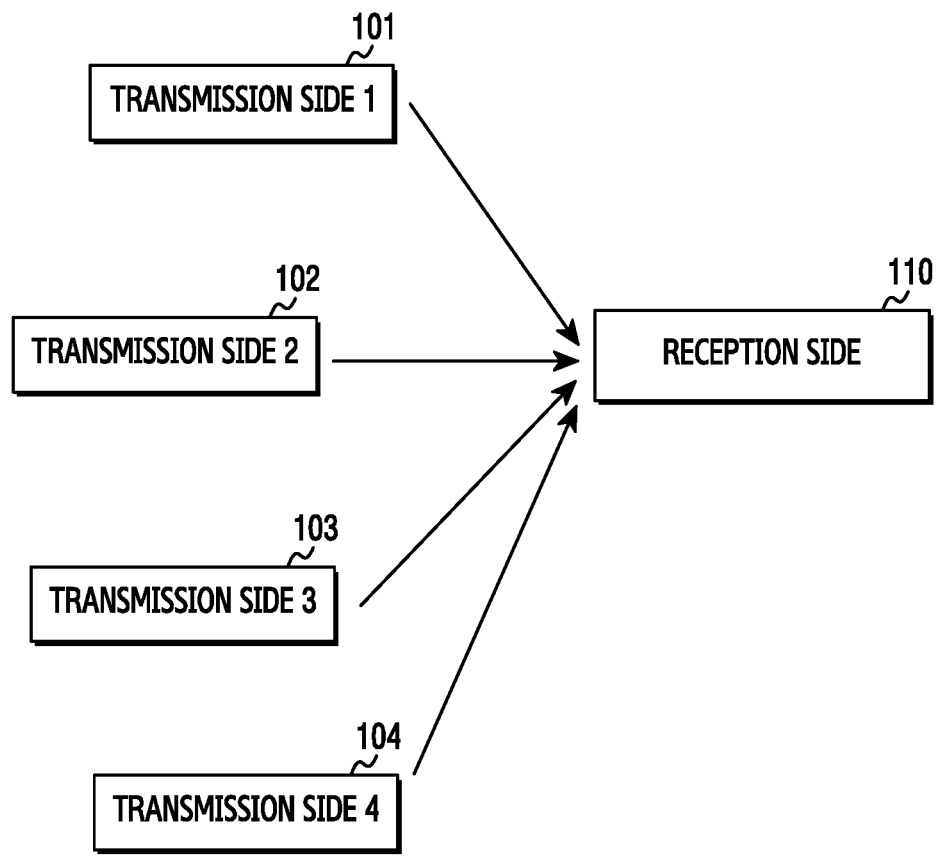
FIG. 1 illustrates a plurality of transmission sides for transmitting signals to a reception side in a wireless communication system.

FIG. 1 illustrates a plurality of transmission sides for transmitting signals to a reception side in a wireless communication system.

A reception side 110 receives signals transmitted by transmission sides 101 to 104. The transmission sides 101 to 104 and the reception side 110 may be UEs and a Base Station (BS), respectively. Conversely, the transmission sides 101 to 104 and the reception side 110 may be, for example, BSs and a UE that comply with a transmission technology (for example, Coordinated Multi Point (CoMP)), in which a plurality of BSs provides services to one UE. Further, each of the transmission sides 101 to 104 does not mean one device but may mean, for example, transmission of a signal which one BS transmits to the UE through different Radio Access Technologies (RATs) in a downlink environment. In addition, the transmission sides 101 to 104 may be ends, which are starting points or ending points of data transmission, as devices communicating with the reception side 110. The transmission sides 101 to 104 may communicate with the reception side through a wireless channel FIG. 1 illustrates one reception side and four transmission sides for convenience of description, but more reception sides and transmission sides may be comprised.

Transmission sides 101 to 104 in FIG. 1 are only examples of an electronic device, and the type thereof is not limited. An electronic device according to various embodiments of the present disclosure may comprise at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Figure 2:
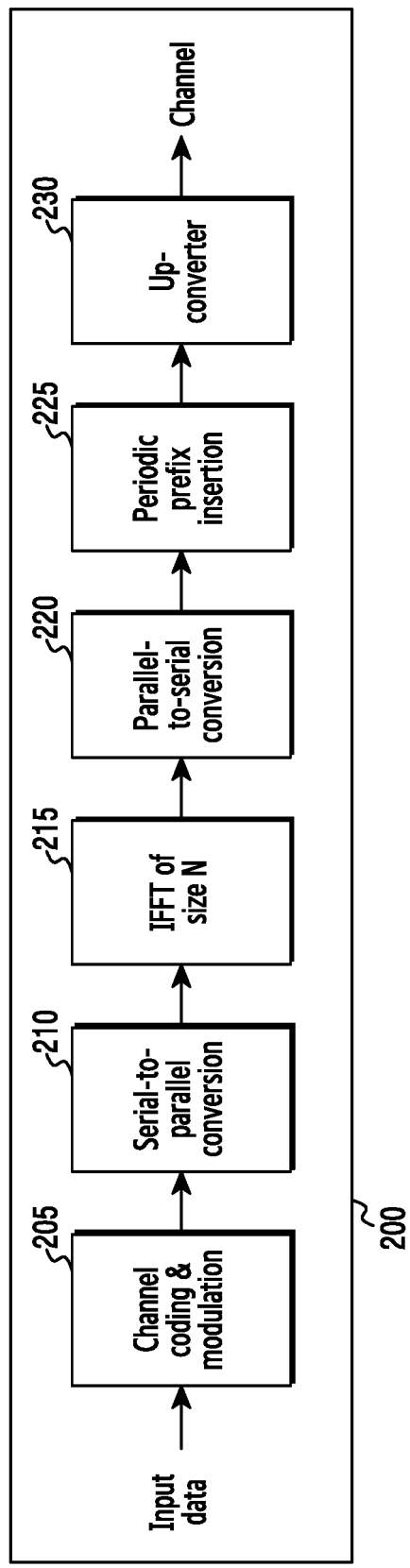
FIG. 2 is a diagram illustrating a transmission path in a wireless communication system.
Figure 3:
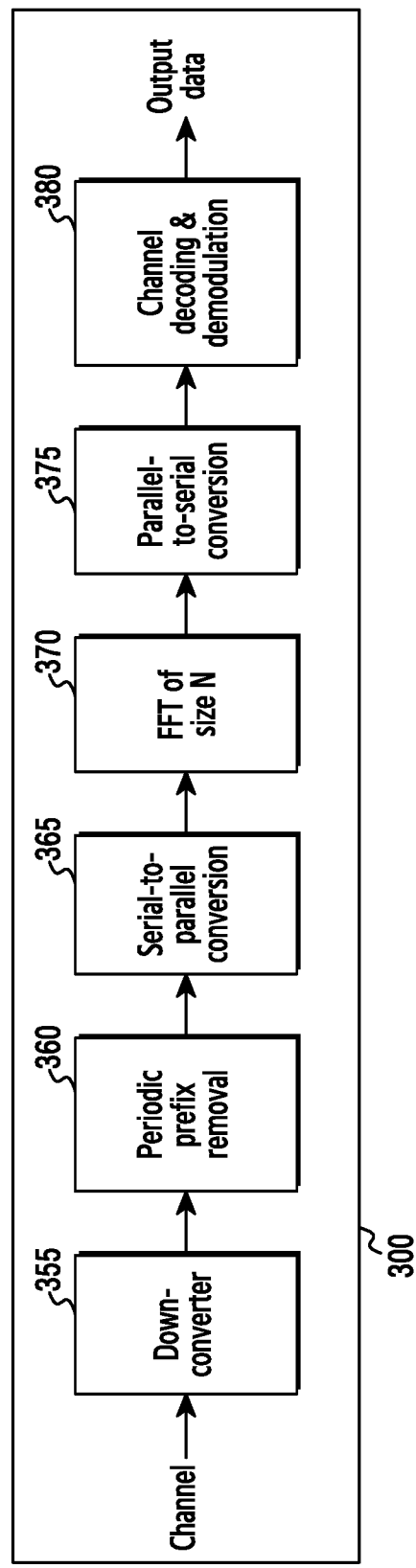
FIG. 3 is a diagram illustrating a reception path in a wireless communication system.

FIG. 2 is a diagram illustrating a transmission path 200 in a wireless communication system. For example, the transmission path 200 may be used in Orthogonal Frequency Division Multiple Access (OFDMA) communication. FIG. 3 is a diagram illustrating a reception path 300 in a wireless communication system. For example, the reception path circuit 300 may be used in OFDMA communication. In FIGS. 2 and 3, for downlink communication, the transmission path 200 may be used by a BS or a relay station, and the reception path circuit 300 may be used by a UE (for example, transmission side #1 101 of FIG. 1). In another example, for uplink communication, the reception path 300 may be used by a BS (for example, the reception side 110 of FIG. 1) or a relay station, and the transmission path 200 may be used by a UE.

The transmission path 200 comprises a channel coding and modulation block 205, a Serial-to-Parallel (S-to-P) conversion block 210, an N-sized Inverse Fast Fourier Transform (IFFT) block 215, a Parallel-to-Serial (P-to-S) block 220, a Cyclic Prefix (CP) insertion block 225, and an Up-Converter (UC) 230. The reception path 300 comprises a Down-Converter (DC) 355, a cyclic prefix removal block 360, a serial-to-parallel conversion block 365, an N-sized Fast Fourier Transform (FFT) block 370, a parallel-to-serial conversion block 375, and a channel decoding and demodulation block 380.

While some elements of FIGS. 2 and 3 may be implemented as software, other elements may be implemented as a combination of hardware and software or as hardware. In particular, the FFT block and the IFFT block described in the present disclosure may be implemented as hardware, and N, which is the size of the FFT block and the IFFT block, may be changed according to the implementation.

Further, the present disclosure provides an embodiment in which FFT and IFFT are used, but such use is only an example of a method, and should not be construed as limiting the scope of the present disclosure. In another embodiment of the present disclosure, an FFT function and an IFFT function may be replaced with a Discrete Fourier Transform (DFT) function and an Inverse Discrete Fourier Transform (IDFT) function, respectively. While a variable N in the DFT and IDFT functions may be an integer (such as 1, 2, 3, or 4), a variable N in the FFT and IFFT functions may be an integer (such as 1, 2, 4, 8, or 16) which is a power of 2.

In the transmission path 200, the channel coding and modulation block 205 receives a set of information bits, applies coding (for example, a Low-Density Parity Check code (LDPC)), and modulate input bits to generate a sequence of modulation symbols in a frequency domain (Quadrature Phase Shift Keying (QPSK) or Quadrature Amplitude Modulation (QAM)). The serial-to-parallel conversion block 210 converts (that is, de-multiplexes) serially modulated symbols into parallel data in order to generate N parallel symbol streams, wherein the converted data has the IFFT/FFT size used by the transmission side #1 101 and the reception side 110. The N-sized IFFT block 215 performs an IFFT operation on the N parallel symbol streams in order to generate an output signal in a time domain. The parallel-to-serial conversion block 220 converts (that is, multiplexes) parallel time domain output symbols from the N-sized IFFT block 215 in order to generate a serial time-domain signal. The cyclic prefix insertion block 225 inserts a cyclic prefix into a time-domain signal. Further, the cyclic prefix insertion block 225 may insert a cyclic postfix into the time-domain signal. Hereinafter, the abbreviation for CP indicates a cyclic prefix. Lastly, the up-converter 230 modulates (that is, up-converts) an output of the cyclic prefix insertion block 225 into a radio frequency (RF) signal for transmission through a wireless channel. The time-domain signal may be also filtered in a baseband before it is converted into an RF.

The transmitted RF signal arrives at the reception side 110 after passing through a wireless channel, and inverse operation of the signal is performed by the reception side 110. The down-converter 355 down-converts the received signal into a baseband frequency, and the cyclic prefix removal block 460 removes a cyclic prefix in order to generate a serial time-domain baseband signal. Further, the cyclic prefix removal block 460 may remove a cyclic postfix from the signal. The serial-to-parallel conversion block 365 converts a time-domain baseband signal into a parallel time-domain signal. The N-sized FFT block 370 performs an FFT algorithm in order to generate N parallel frequency-domain signals. The parallel-to-serial conversion block 375 converts the serial frequency-domain signal to a modulated data symbol sequence. The channel coding and demodulation block 380 demodulates and decodes the modulated symbols in order to reconstruct the original input data stream.

FIGS. 2 and 3 illustrate that the blocks constituting the transmission path 200 and the reception path 300 sequentially perform a series of procedures, but the orders of some blocks may be changed. For example, the cyclic prefix insertion block 225 may be located before the parallel-to-serial conversion block 220, and thus the parallel-to-serial conversion block 220 may convert (that is, multiplex) parallel time domain symbols after the cyclic prefix insertion block 225 inserts the cyclic prefix into the signal. In another example, the cyclic prefix removal block 360 may be located after the parallel-to-serial conversion block 365, and thus may remove the cyclic prefix from the signal after the parallel-to-serial conversion block 365 converts a time-domain baseband signal into a parallel time-domain signal.

Figure 4A:
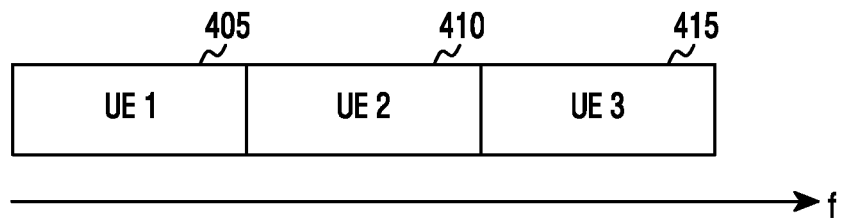
FIGS. 4A and 4B illustrate a situation in which interference is generated between transmission sides allocated to adjacent frequency bands.
Figure 4B:
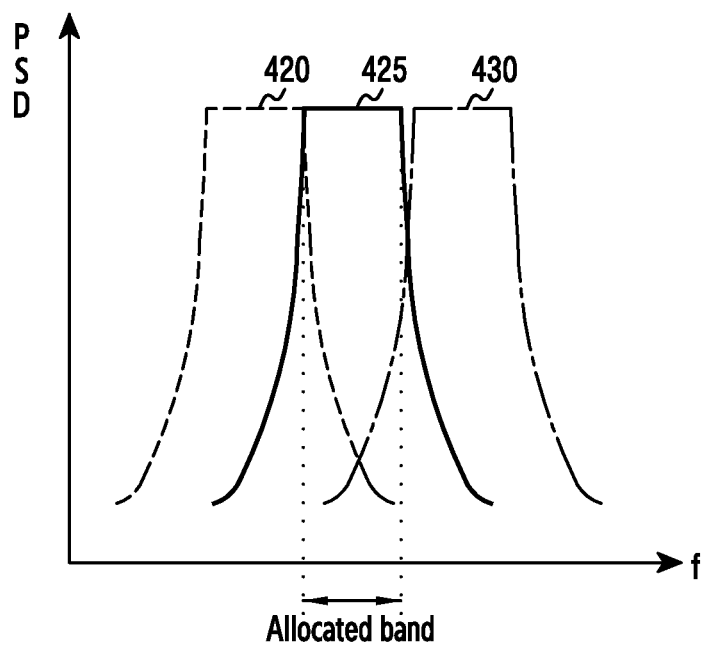

FIGS. 4A and 4B illustrate the situation in which interference is generated between transmission sides allocated to adjacent frequency bands.

FIG. 4A illustrates that frequency resources are adjacently allocated to UE #1 405, UE #2 410, and UE #3 415 in the frequency band in a wireless communication system. Each of UE #1 405, UE #2 410, and UE #3 415 may transmit or receive a signal through the frequency band allocated thereto. Hereinafter, the frequency band allocated to the UE may mean a channel allocated to the UE in the present disclosure. However, if the UE #1 405, UE #2 410, and UE #3 415 transmit or receive signals using adjacently allocated frequency resources, interference may be generated between the signals. For example, due to the difference in distance between each UE and the BS in an uplink environment of the wireless communication system, a difference in time at which the BS receives signals transmitted by UEs, that is, a time offset, may be generated, and the time offset may create interference such as Inter-User Interference (IUI) or Inter-Symbol Interference (ISI). Asynchronous characteristics that can be generated by a frequency offset and a Doppler effect between signals transmitted by a plurality of UEs in an uplink environment as well as the time offset may create interference between the signals transmitted by the plurality of UE.

FIG. 4B is a graph illustrating a Power Spectral Density (PSD) of each of UE #1 405, UE #2 410, and UE #3 415. In the present embodiment, a PSD 420, a PSD 425, and a PSD 430 correspond to the PSD of UE #1 405, UE #2 410, and UE #3 415, respectively. According to FIG. 4B, the PSD 425 of UE #2 410 may exist outside the frequency band allocated to UE #2 410. In other words, the PSD 425 of UE #2 410 may be radiated to the outside of the frequency band allocated to UE #2 410. As illustrated in FIGS. 4A and 4B, not only the PSD 425 but also the PSD 430 and the PSD 420 may be radiated to the outside of the allocated frequency bands. The PSD 425 is radiated to the outside of the frequency band allocated to UE #2 410 and thus influences the PSD 420 of UE #1 405 and the PSD 430 of UE #3 415 allocated to adjacent frequency bands. The PSD 425 radiated to the outside of the frequency band allocated to UE #2 410 may overlap the PSD 420 and the PSD 430 and distort the PSD 420 and the PSD 430, which results in interference. In other words, if a plurality of UEs is allocated to adjacent frequency bands, the PSD of one UE overlaps the PSD radiated from another UE allocated adjacent thereto, so that interference may be generated. Accordingly, the more severe the degree of attenuation of the PSD radiated to the outside of the frequency band allocated to the UE, the less the PSD of the UE influences the PSD of another UE allocated to the adjacent frequency band and interference between signals transmitted by the UEs adjacently allocated in the frequency bands. In the present disclosure, the attenuation degree of the PSD radiated to the outside of the frequency band allocated to the UE is defined as an "attenuation level." In other words, a high attenuation level means a high degree of attenuation of the PSD radiated to the outside of the frequency band allocated to the UE. Further, in the present disclosure, the high PSD attenuation level in the frequency band allocated to the UE may have the same meaning as a small amount of the PSD radiated to the outside of the frequency band.

Figure 5:
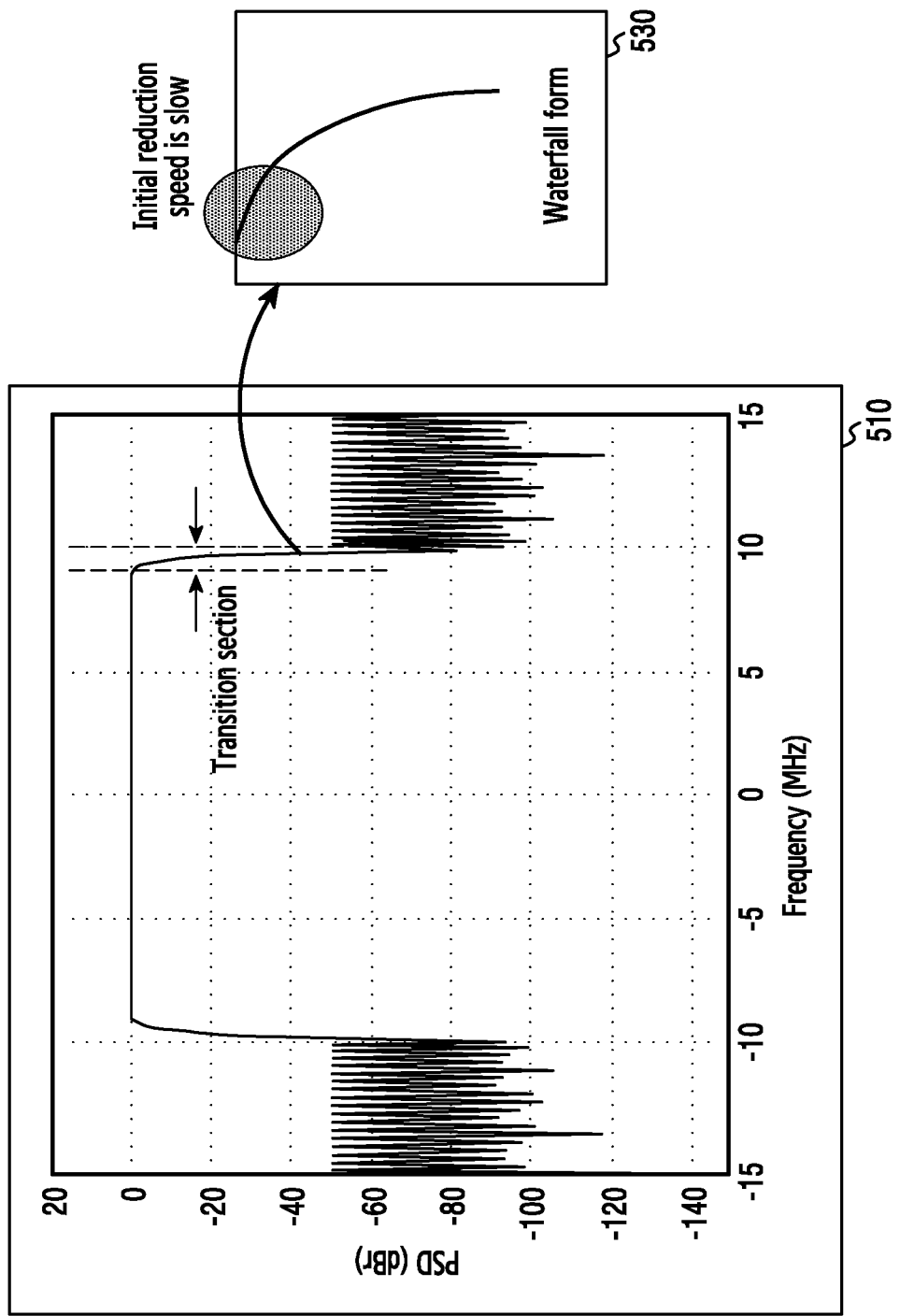
FIG. 5 illustrates the frequency response of an OFDM filter for controlling interference according to an embodiment of the present disclosure.

FIG. 5 illustrates the frequency response of an OFDM filter for controlling interference according to an embodiment of the present disclosure.

The UE may filter a transmission signal through the OFDM filter. Filtering may mean making the size of the PSD of a particular frequency component small in a frequency response of the signal transmitted by the UE. Specifically, the UE may perform a convolution operation on the transmission signal in a time domain with a particular filter or convert the transmission signal to a transmission signal in a frequency domain, and then multiply the frequency response of the particular filter and the converted transmitted signal in the frequency domain so as to filter the transmitted signal.

According to the graph 510, the frequency response of the OFDM filter may be largely divided into a pass band and a stop band. The pass band refers to a frequency section comprising a frequency component to be transmitted without any distortion in the transmission signal. The size of the frequency response of the filter indicated by the PSD in the pass band is defined as 0 dB. In other words, if the PSD of the frequency response of the filter is multiplied by the PSD of the converted transmission signal, the PSD of the converted transmission signal in the pass band of the filter is maintained as it is. The pass band may be configured equally to, for example, the frequency band to which the signal transmitted by the UE is allocated. The stop band refers to a frequency section comprising a frequency component from which an amount of the PSD radiated to the outside of the frequency band allocated to the UE should be reduced through a reduction in the size of the PSD. The size of the frequency response of the filter indicated by the PSD in the stop band has a very small decibel value. In other words, if the PSD of the frequency response of the filter is multiplied by the PSD of the converted transmission signal, the PSD of the converted transmission signal in the stop band of the filter may become very small.

By filtering the transmission signal, the UE may maintain the PSD of the transmission signal in the frequency band allocated to the UE as it is and reduce the PSD of the transmission signal radiated to the outside of the frequency band allocated to the UE. In other words, it is possible to increase the attenuation level of the PSD radiated to the outside of the frequency band allocated to the UE by multiplying the PSD of the transmission signal and the PSD corresponding to the pass band of the filter in the frequency band allocated to the UE and multiplying the PSD of the transmission signal and the PSD corresponding to the stop band of the filter in sections other than the frequency band allocated to the UE.

In the graph 510, a transition section in the frequency response of the filter is shown. The transition section is a section in which the frequency response of the filter is rapidly changed. In the OFDM filter, the frequency response of the transition section has a waterfall form. The waterfall form refers to a form in which a PSD curve of the frequency response in the transition section is convex, as indicated by reference numeral 530. In other words, the transition section in the waterfall form means that the speed of the reduction from the PSD of the pass band to the PSD of the stop band is slow. Accordingly, if the UE applies the OFDM filter to the transmission signal, it is not possible to effectively increase the attenuation level of the PSD radiated to the outside of the frequency band allocated to the UE. Further, if filtering is performed, the UE should perform a convolution operation on the transmission signal with a time-domain function of the filter in the time domain or convert the transmission signal to a transmission signal in the frequency domain, and then perform an operation of multiplying the converted transmission signal and the frequency response of the filter, and, accordingly it is very complex to apply the OFDM filter to the transmission signal.

Figure 6:
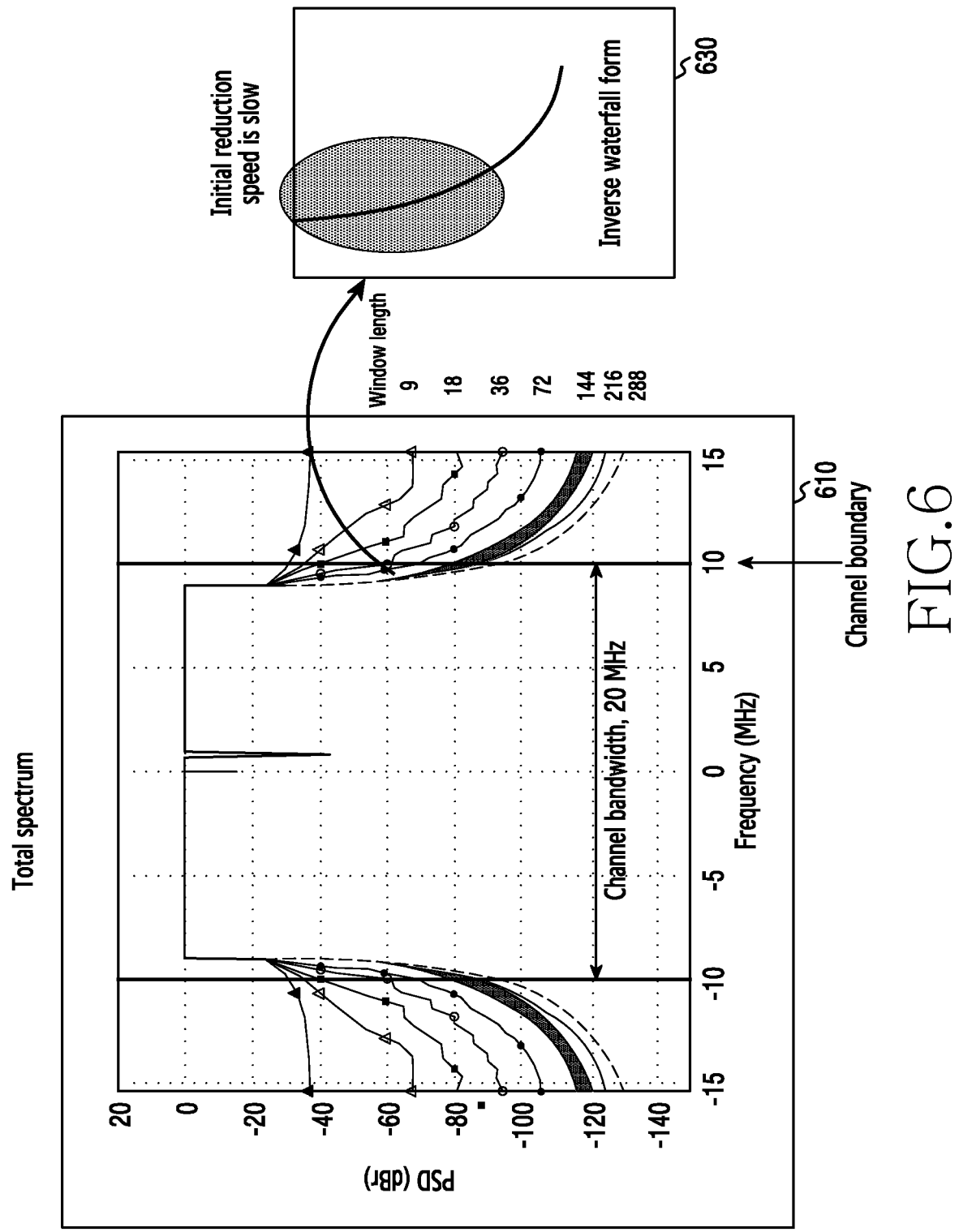
FIG. 6 illustrates a frequency response if a window is applied to control interference according to an embodiment of the present disclosure.

FIG. 6 illustrates a frequency response if a window is applied to control interference according to an embodiment of the present disclosure.

The term "window" means multiplying a signal of the time domain and a particular function in order to prevent the signal of the time domain from being rapidly changed. In the present disclosure, the particular function multiplied by the signal of the time domain is defined as "a window function" hereinafter. Further, in the present disclosure, multiplying the signal of the time domain and the window function is expressed as "applying the window to the signal." If the window is applied to the transmission signal, a rapid change in the signal can be prevented, so that a high-frequency component, among frequency components of the transmission signal, can be reduced. In other words, the size of the PSD may become smaller in a frequency domain outside the frequency band allocated to the transmission signal.

Since applying the window to the transmission signal means multiplying the signal of the time domain and the particular function, the signal of the time domain may be distorted. The rate at which the transmission signal is distorted may vary depending on the abstract shape of the window function multiplied by the transmission signal, and the rate of the transmission signal distorted by the window function is defined as "a window length" in the present disclosure. As the length of the window applied to the transmission signal increases, the rate of the distorted transmission signal increases, but the transmission signal is changed less rapidly, so that a high-frequency component among the frequency components of the transmission signal may be further reduced. In other words, as the length of the window applied to the transmission signal is longer, the attenuation level of the PSD radiated to the outside of the frequency band allocated to the transmission signal may become higher.

The graph 610 shows the frequency response of the transmission signal to which the window is applied if the window is applied to the transmission signal. According to the present embodiment, it is assumed that the bandwidth of a channel used by the transmission signal is 20 MHz. Further, the graph 610 indicates that, as the length of the window applied to the transmission signal is longer, the attenuation level of the PSD radiated to the outside of the frequency band allocated to the transmission signal is higher. According to the graph 610, unlike the case in which the OFDM filter is applied to the transmission signal, a form in which the PSD of the transmission signal is attenuated outside the frequency band allocated to the transmission signal is an inverse waterfall form in the case in which the window is applied to the transmission signal. The inverse waterfall form refers to a concave form of the PSD curve in an area in which the PSD is attenuated, as indicated by reference numeral 630. In other words, if the window is applied to the transmission signal, the PSD of the transmission signal is sharply reduced as the PSD goes beyond the frequency band allocated to the transmission signal. Accordingly, it is possible to effectively increase the attenuation level of the PSD radiated to the outside of the frequency band allocated to the transmission signal if the window is applied to the transmission signal. Further, if the window is applied to the transmission signal, the UE multiplies the transmission signal and the window function in the time domain, so that it is less complex than filtering in which a convolution operation must be performed between the transmission signal in the time domain and the time-domain function of the filter.

Figure 7:
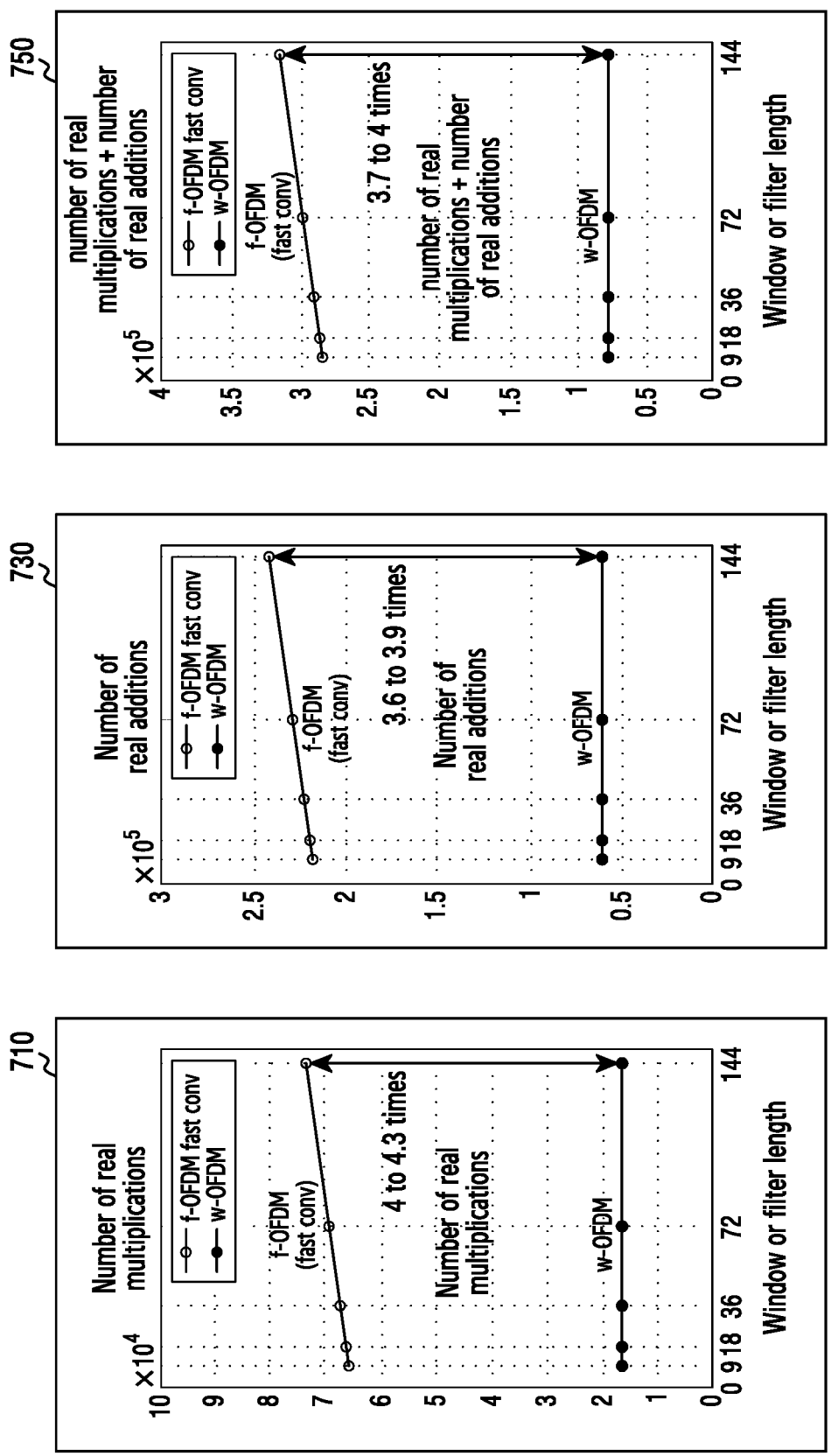
FIG. 7 illustrates graphs showing complexity in the cases in which the OFDM filter is used and the window is used to control interference.

FIG. 7 illustrates graphs showing complexity in cases in which the OFDM filter is used and in which the window is used to control interference.

Complexity refers to a scale indicating how efficiently a particular operation is performed. Complexity indicates how long it takes to perform a particular operation. For example, if it takes a short time for a particular operation, it may be considered that the complexity is low. Further, even operations obtaining the same result may have different complexities depending on the operation scheme. The complexity may be measured by the number of real multiplications and the number of real additions used to perform the operation. Since the time required to perform one multiplication operation and one real addition operation is predetermined, it takes a longer time to perform total operations as the number of the real multiplication operations and the number of real addition operations are larger. In other words, as the number of the real multiplication operations and the number of real addition operations are larger, the complexity is higher.

The graph 710 illustrates the number of real multiplications used for the operation in cases in which the OFDM filter is applied to the transmission signal and the window is applied to the transmission signal. The graph 710 indicates that the number of multiplications used for the operation in the case in which the OFDM filter is applied to the transmission signal is four times as many as the case in which the number of real multiplications used for the operation in the case in which the window is applied to the transmission signal. Further, the graph 710 indicates that, as the length of the window or the filter increases, the number of multiplications used for the operation in the case in which the OFDM filter is applied increases, but the number of multiplications used for the operation in the case in which the window is applied is slightly changed.

The graph 730 illustrates the number of real additions used for the operation in cases in which the OFDM filter is applied to the transmission signal and the window is applied to the transmission signal. The graph 730 indicates that the number of additions used for the operation in the case in which the OFDM filter is applied to the transmission signal is four times as many as the case in which the number of real additions used for the operation in the case in which the window is applied to the transmission signal. Further, the graph 730 indicates that, as the length of the window or the filter increases, the number of additions used for the operation in the case in which the OFDM filter is applied increases but the number of additions used for the operation in the case in which the window is applied is slightly changed.

The graph 750 illustrates the sum of the number of real multiplications and the number of real additions used for the operation in cases in which the OFDM filter is applied to the transmission signal and the window is applied to the transmission signal. In other words, the graph 750 shows total complexity in the case in which the OFDM filter is applied and the case in which the window is applied. The graph 750 indicates that the total complexity in the case in which the OFDM filter is applied to the transmission signal is about four times as much as the total complexity in the case in which the window is applied to the transmission signal. Further, the graph 750 indicates that, as the length of the window or the filter increases, the total complexity increases in the case in which the OFDM filter is applied but the total complexity is slightly changed in the case in which the window is applied.

The graph 710, the graph 730, and the graph 750 indicate that the complexity in the case in which interference is controlled by applying the window to the transmission signal is significantly lower than the complexity in the case in which interference is controlled by applying the filter to the transmission signal. While application of the window to the transmission signal can be simply implemented through multiplication of the transmission signal and the window function in the time domain, application of the filter to the transmission signal requires a convolution operation between the transmission signal and the time-domain function of the filter, thereby increasing complexity.

According to the above-described embodiments, the application of the window to the transmission signal to control interference may further increase the attenuation level of the PSD radiated to the outside of the allocated frequency band and reduce complexity further than the application of the filter. Accordingly, a method of effectively applying the window to control interference in the wireless communication system is required.

Figure 8A:
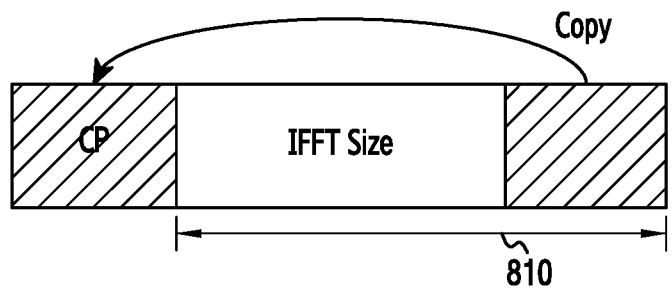
FIGS. 8A, 8B, and 8C illustrate multiplication of one symbol and a window function in a time domain.
Figure 8B:
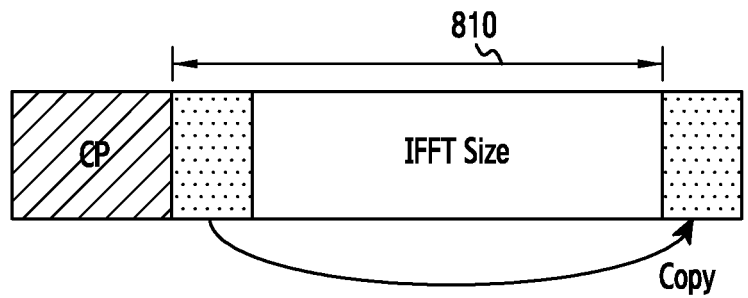
Figure 8C:
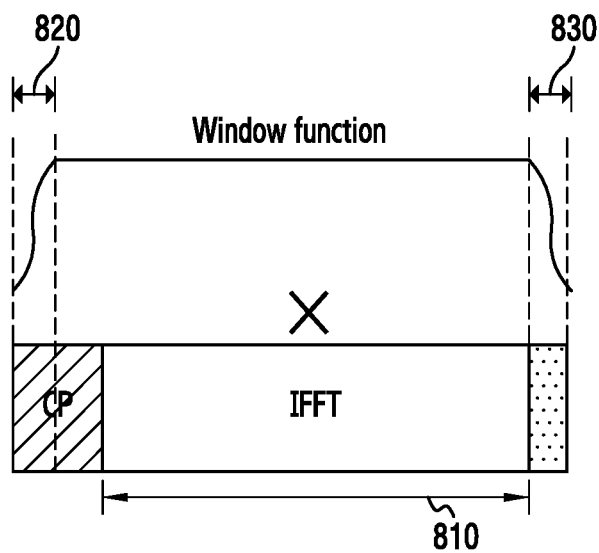

FIGS. 8A, 8B, and 8C illustrate multiplication of one symbol and a window function in a time domain.

FIG. 8A illustrates insertion of a cyclic prefix into a symbol. Adding the cyclic prefix corresponds to copying a part of a rear portion of an original symbol 810 and inserting the copied part to a front portion of the original symbol 810. Adding the cyclic prefix to the transmission signal of the UE in the OFDM system may be used to remove a time offset between signals if, for example, the BS receives the signals from a plurality of UEs. That is, if a time offset is generated between signals that the BS receives from a plurality of UEs, the time offset may be removed by removing the cyclic prefix in which the time offset is generated.

FIG. 8B illustrates insertion of a cyclic postfix into a symbol. Adding the cyclic postfix corresponds to copying a part of a front portion of the original symbol 810 and inserting the copied part to a rear portion of the original symbol 810. The length of the cyclic postfix may be the same as or different from the length of the cyclic prefix.

FIG. 8C illustrates multiplying a window function and a symbol to which cyclic prefix and cyclic postfix are added. The window function is multiplied by the symbol in the time domain. Specifically, multiplying the window function and the symbol in the time domain refers to multiplying a value of the window function and each index corresponding to a value of a sample constituting the symbol among all indexes. If the window function is multiplied by the symbol in the time domain, the symbol may have a distorted portion. Specifically, the symbol corresponding to a window length 820 and a window length 830 at both ends of the symbol is distorted. In FIG. 8C, since the window length 820 and the window length 830 are shorter than lengths of the cyclic prefix and the cyclic postfix, the original symbol 810 is not distorted. However, if the window length 820 and the window length 830 are longer than the lengths of the cyclic prefix and the cyclic postfix, the original symbol 810 may be distorted. If the window is applied and the original symbol 810 is distorted, orthogonality of the signal is destroyed, and thus an SIR (signal to noise power ratio) of the signal may be reduced. In other words, if the window length is long, the attenuation level of the PSD radiated to the outside of the frequency band to which the signal is allocated may increase, but if the window length is longer than the lengths of the cyclic prefix and the cyclic postfix, the original signal may be distorted, and the SIR of the signal may be reduced.

Figure 9:
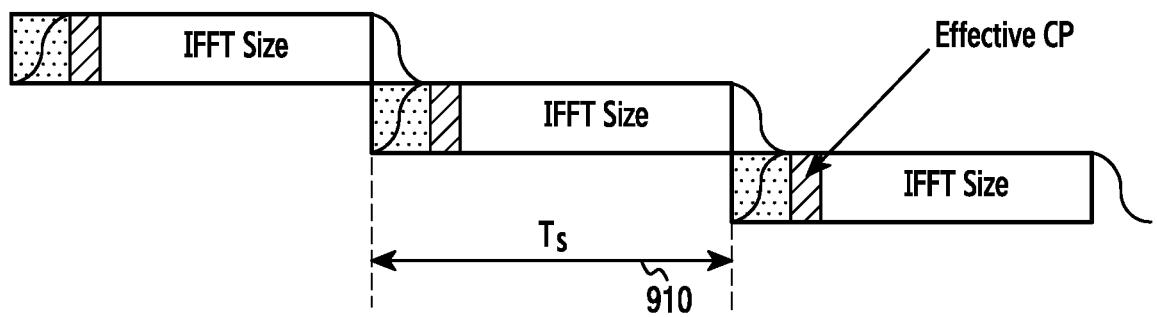
FIG. 9 illustrates the transmission of symbols to which the window is applied.

FIG. 9 illustrates transmission of symbols to which the window is applied.

The transmission side transmits a symbol sequence comprising symbols generated by adding a cyclic prefix and a cyclic postfix to the original symbol. At this time, a cyclic-postfix portion of the previously transmitted symbol and a cyclic-prefix portion of the currently transmitted symbol overlap each other. Further, a cyclic-postfix portion of the currently transmitted symbol and a cyclic-prefix portion of the subsequently transmitted symbol overlap each other. Accordingly, the actual period of the transmitted symbol may be shorter than the period of the original symbol. In other words, a symbol period 910 becomes the actual transmission period.

If the window is applied to every transmitted symbol to control interference, both ends of all symbols may be distorted by the window length, as illustrated in FIG. 9. Since the cyclic postfix of the previously transmitted symbol and the cyclic prefix of the currently transmitted symbol overlap each other, the distorted cyclic-postfix portion of the previous symbol through the multiplication of the window function may be comprised in the distorted cyclic-prefix portion of the current symbol. In other words, controlling interference by applying the window to the signal means controlling interference by distorting the cyclic prefix if the window length is short than the length of the cyclic prefix. In the present disclosure, the length of the CP, which is not distorted, that is, a length obtained by subtracting the window length from the length of the cyclic prefix, is defined as an "effective Cyclic Prefix (CP)."

If the symbol sequence passes through a channel, the length of each symbol that has passed through the channel may increase. That is, if the symbol sequence passes through the channel, the convolution operation is performed between an impulse response and each symbol and the length of each symbol that has passed through the channel increases by the length of the impulse response of the channel. The increasing length of the symbol corresponds to a maximum delay spread. The increasing length of the symbol after passing through the channel may influence the subsequently transmitted symbol and generate ISI. Further, if the increasing length of the symbol after passing through the channel influences the subsequently transmitted symbol, Inter-Carrier Interference (ICI) may be generated if an FFT operation is performed on symbols. However, if CP longer than the length of maximum delay spread is used, a portion influenced by the maximum delay spread of the previous symbol is limited to a CP portion of the current symbol and the CP is removed by the cyclic prefix removal block 360 on the reception side, so that the current symbol may not be influenced by the maximum delay spread of the previous symbol. In other words, if the length of the CP is longer than the length of the maximum delay spread, ISI and ICI are not generated, and thus a one-tap equalizer can be implemented.

If the window is applied to the transmission signal to control interference, the window function is multiplied by each symbol comprised in the transmitted symbol sequence, and the length of the CP may be reduced by the window length. In other words, if the window is applied to the transmission signal, the length of the effective CP of each CP may be reduced. If a long window is used, the length of the effective CP of the symbol may be shorter, and the effective CP may be shorter than the length of the maximum delay spread of a multipath channel. Accordingly, if the long window is used, ISI and ICI may be generated, and the system performance may deteriorate if a one-tap equalizer is used.

Therefore, a method of minimizing deterioration of system performance while reducing the PSD radiated to the outside of the frequency band allocated to the transmission signal by applying the window having the window length considering the maximum delay spread of the channel to the transmission is required.

Figure 10:
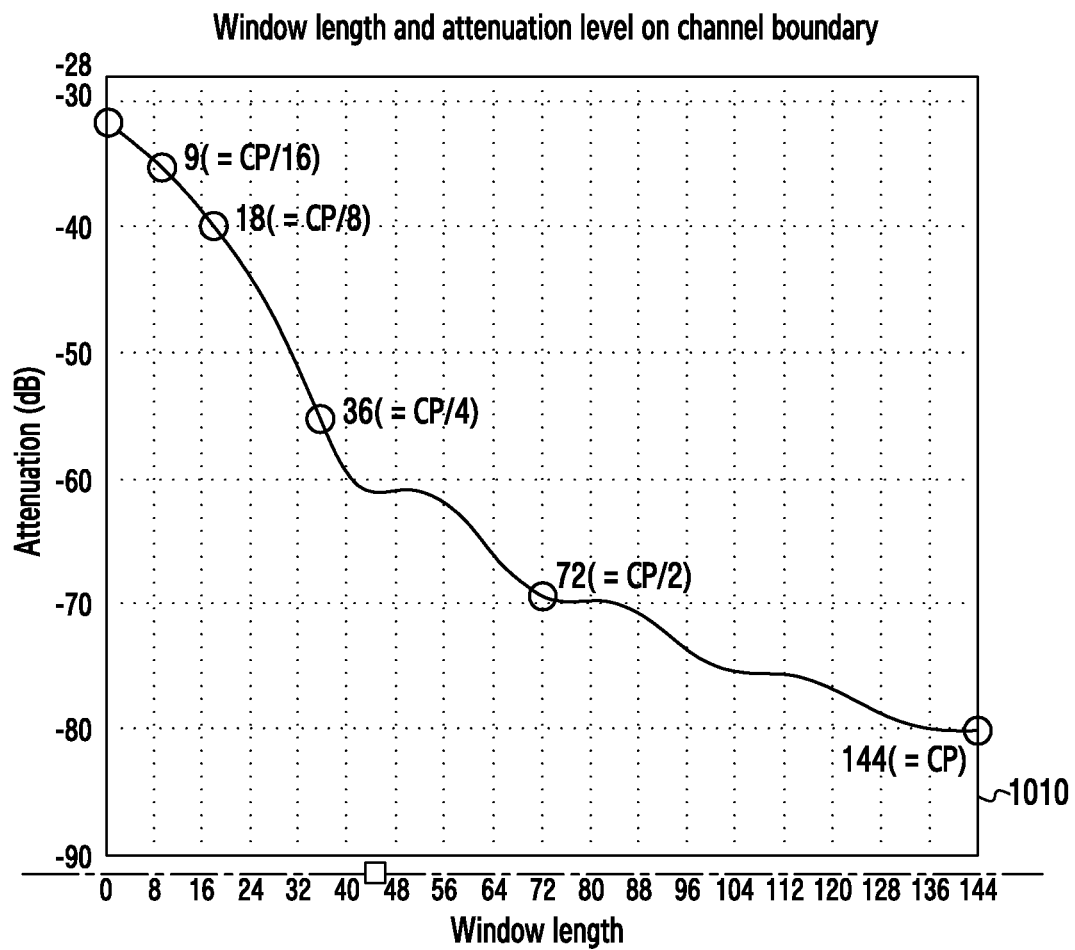
FIG. 10 is a graph showing a window length and an attenuation level.

FIG. 10 illustrates a window length and an attenuation level.

A graph 1010 shows the relationship between the length of the window applied to the transmission signal and the attenuation level of the PSD radiated to the outside of the frequency band allocated to the transmission signal. Referring to the graph 1010, as the length of the window applied to the transmission signal is longer, the attenuation level of the PSD radiated to the outside of the frequency band allocated to the transmission signal is higher. Since the transmission signal is less rapidly changed as the length of the window applied to the transmission signal is longer, a high-frequency component among frequency components of the transmission signal may be further reduced, and the attenuation level of the PSD radiated to the outside of the frequency band allocated to the transmission signal may become higher.

In the present disclosure, it is assumed that the number of samples comprised in the CP of the symbol is 144. In other words, the length of the CP of the symbol is 144. In the graph 1010, a ratio of the CP in the window length is shown. For example, a window length of 9 means that the window length is one-sixteenth of the CP length. Further, a window length of 36 means that the window length is one fourth of the CP length. Referring to the graph, as the ratio of the window length in the CP increases, the attenuation level increases. In other words, as the number of sample values distorted by the window is larger in the CP, the attenuation level of the PSD in a channel boundary is higher.

A table 1030 shows the relationship between the length of the window applied to the transmission signal and the attenuation level of the PSD radiated to the outside of the frequency band allocated to the transmission signal. According to the table 1030, in the case in which the window is applied to the transmission signal, the attenuation level of the PSD in the boundary of the channel allocated to the transmission signal is higher than the case in which the window is not applied. Further, if the window is applied to the transmission signal, the attenuation level of the PSD in the boundary of the channel allocated to the transmission signal is higher as the length of the applied window is longer.

According to the graph 1010 and the table 1030, as the length of the window applied to the transmission signal is longer, the attenuation level at the boundary of the channel allocated to the transmission signal is higher. However, if the window length becomes longer than the CP length, and thus the original symbol is distorted, orthogonality of the signal may be destroyed, and the SIR of the signal may be reduced. Further, if the window length becomes longer and the effective CP is shorter than the length of the maximum delay spread of the channel, ISI and ICI may be generated, and thus implementation of a one-tap equalizer is difficult, so that the system performance may deteriorate. Accordingly, if the window is applied to the transmission signal, it is required to reduce the length of the applied window and increase the attenuation level of the PSD radiated to the outside of the boundary of the channel allocated to the transmission signal.

Figure 11:
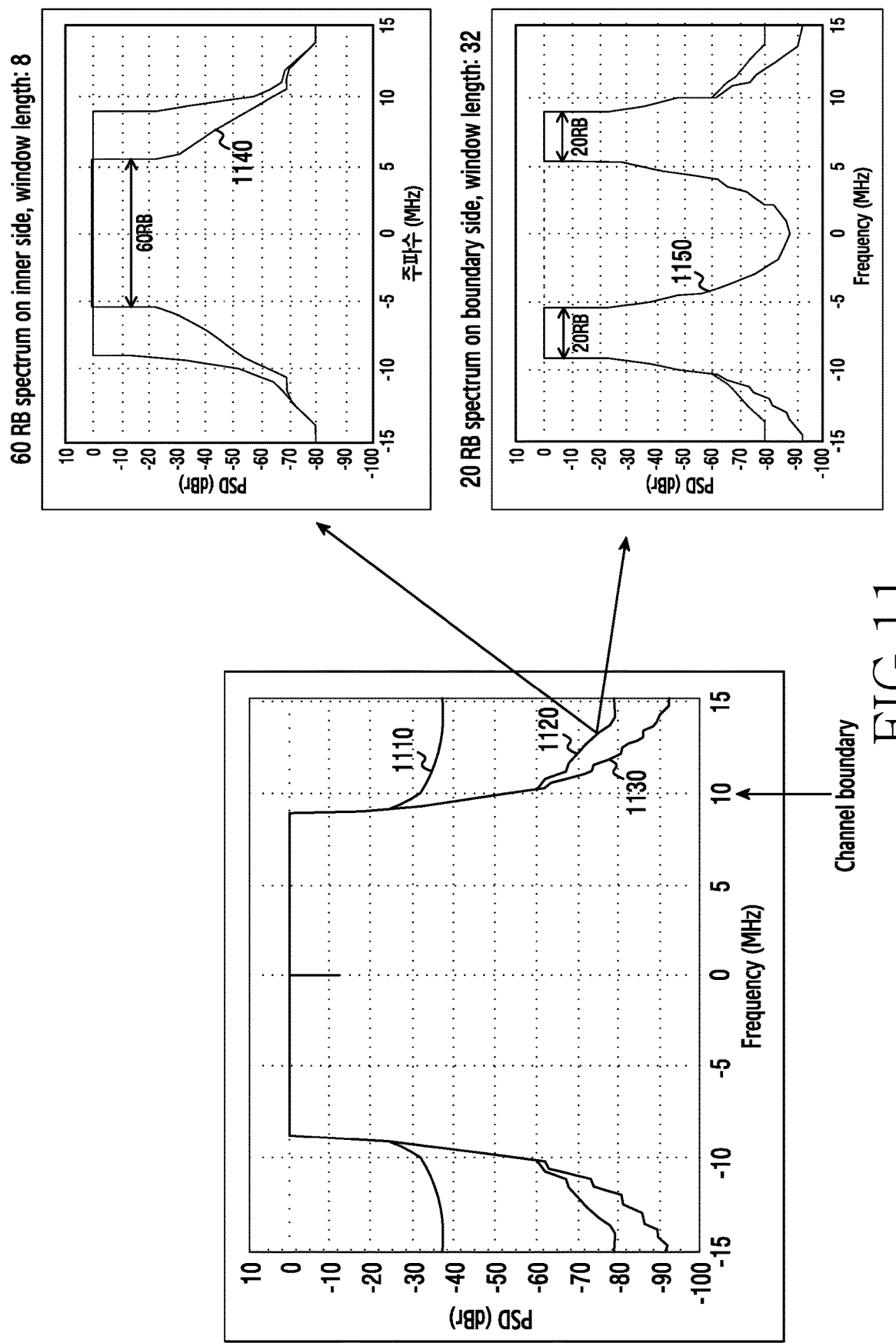
FIG. 11 illustrates the application of windows having different lengths to a Resource Block (RB) on a boundary side of a channel and an RB on an inner side of a channel.

FIG. 11 illustrates the application of windows having different lengths to a Resource Block (RB) on a boundary side of the channel and an RB on an inner side of the channel.

The channel allocated to the transmission signal may comprise subcarriers of the transmission signal. Each subcarrier may correspond to one RB in the frequency domain. In the present embodiment, it is assumed that 100 RBs are comprised in the bandwidth of the channel allocated to the transmission signal.

A curve 1110 indicates the PSD of the transmission signal if the window is not applied to the transmission signal. If the window is not applied to the transmission signal, the PSD in the outside of the channel allocated to the transmission signal has a large value. If the window is not applied to the transmission signal, a symbol value of the transmission signal is rapidly changed, and thus frequency components of the transmission signal comprise many high-frequency components. If the frequency components of the transmission signal have many high-frequency components, the PSD of the transmission signal may have a large value outside the channel.

A curve 1130 indicates the PSD of the transmission signal if the window having the same length is applied to all RBs comprised in the channel of the transmission signal. In other words, the curve 1130 indicates the PSD of the signal obtained by acquiring symbols in the time domain through the IFFT operation on all subcarriers comprised in the channel of the transmission signal and multiplying each symbol and the window function. Hereinafter, it is assumed that the window having the same length applied to all subcarriers comprised in the channel of the transmission signal is a single window. In the present embodiment, it is assumed that the length of the window applied to the transmission signal is 32. However, the length of the applied window is only an example, and a window having a different length may be applied.

A curve 1120 indicates the PSD of the transmission signal if a long window is applied to RBs comprised in the boundary side of the channel of the transmission signal and a short window is applied to RBs comprised in the inner side of the channel of the transmission signal. In other words, the curve 1120 indicates the PSD of the signal obtained by acquiring symbols in the time domain through the IFFT operation on all subcarriers comprised in the channel of the transmission signal, multiplying symbols acquired from subcarriers comprised in the boundary side of the channel and a long window function, and multiplying symbols acquired from subcarriers comprised in the inner side of the channel and a short window function. Hereinafter, windows having different lengths applied to respective subcarriers comprised in the channel of the transmission signal are defined as multiple windows. A curve 1140 indicates the PSD of the signal consisting of RBs comprised in the inner channel, wherein the short window is applied to the RBs comprised in the inner channel A curve 1150 indicates the PSD of the signal consisting of RBs comprised in the boundary side of the channel, wherein the long window is applied to the RBs comprised in the boundary side of the channel. The curve 1120 is a curve obtained by adding the curve 1140 and the curve 1150 on the frequency axis. In the present embodiment, it is assumed that the length of the window applied to RBs comprised in the inner side of the channel of the transmission signal is 8 and that the length of the window applied to RBs comprised in the boundary side of the channel of the transmission signal is 32. However, the length of the applied window is only an example, and a window having a different length may be applied. Further, in the present embodiment, the lengths of the windows applied to RBs comprised in a left boundary and a right boundary of the channel are the same, but the lengths of the windows applied to the RBs comprised in the left boundary and the right boundary of the channel may be different from each other. In addition, numbers of RBs applied to the left boundary and the right boundary may be different from each other. In the present disclosure, the left boundary and the right boundary of the channel refer to a boundary having a low frequency on the boundary of each channel and a boundary having a high frequency on the boundary of the channel.

In comparison among the curve 1110, the curve 1120, and the curve 1130, if the window is applied to the transmission signal, the size of the PSD radiated to the outside of the boundary of the channel allocated to the transmission signal may be reduced. Further, comparing the curve 1120 and the curve 1130, even if the long window is applied only to RBs comprised in the boundary of the channel, the attenuation level of the PSD radiated to the outside of the channel boundary is high, as in the case in which the long window is applied to all RBs comprised in the channel. Accordingly, if multiple windows are applied to the transmission signal, distortion of the transmission signal can be reduced, and the attenuation level of the PSD radiated to the outside of the channel allocated to the transmission channel can be increased.

Figure 12B:
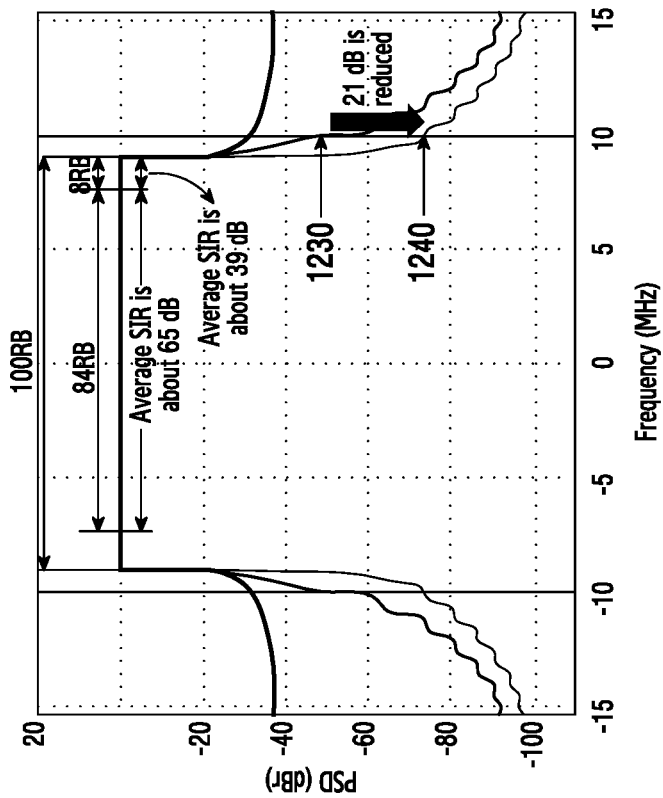
FIGS. 12A and 12B illustrate graphs showing the relationship between the number of RBs comprised in the boundary of the channel to which a long window is applied and an attenuation level.
Figure 12A:
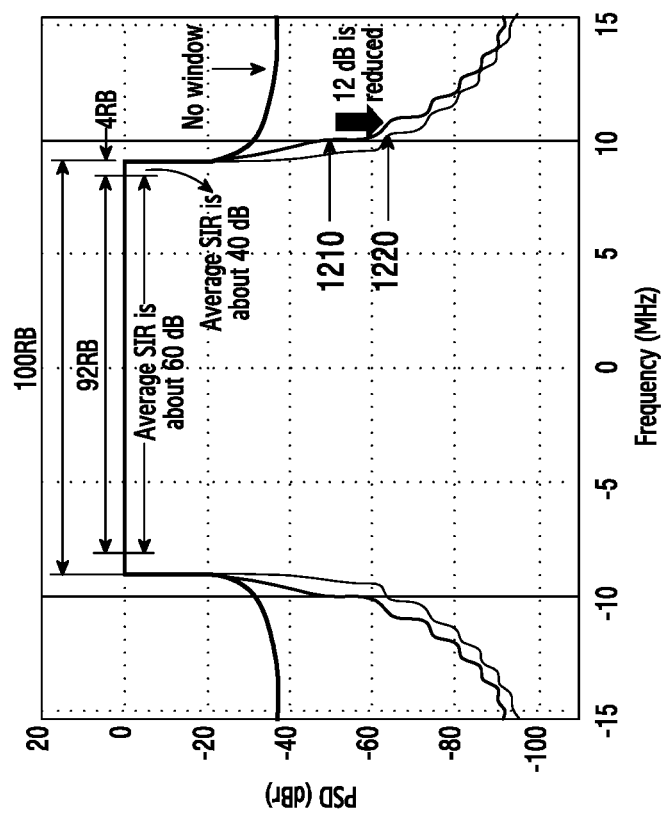

FIGS. 12A and 12B illustrate graphs showing the relationship between the number of RBs comprised in the boundary of the channel to which the long window is applied and the attenuation level.

FIG. 12A illustrates the level at which the size of the PSD radiated to the outside of the channel is reduced if the long window is applied to four RBs comprised in the left boundary and the right boundary of the channel and the short window is applied to 92 RBs comprised in the inner channel A curve 1210 shows that the length of the window applied to all RBs comprised in the channel is 32. A curve 1220 indicates the PSD of the transmission signal if the length of the window applied to RBs comprised in the boundary side of the channel is 216 and the length of the window applied to RBs comprised in the inner side of the channel is 32. In other words, since the length of the CP is 144, the length of the window applied to RBs comprised in the boundary side of the channel is 1.5 times the length of the CP for the curve 1220. Since the length of the window applied to RBs comprised in the boundary side of the channel is longer than the length of the CP, if the window is applied, even the original symbol portion, excluding the CP from the symbol obtained from the RBs comprised in the boundary side of the channel, may be distorted, and thus orthogonality of the signal may be destroyed and the SIR of the signal may be reduced. In FIG. 12A, while an average SIR of the RBs comprised in the inner side of the channel to which a window shorter than the CP is applied is 68 dB, an average SIR of the RBs comprised in the boundary side of the channel to which a window longer than the CP is applied is 40 dB. However, if a long window is applied to the RBs comprised in the boundary side of the channel, the size of the PSD radiated to the outside of the channel boundary may be reduced by 12 dB compared to the case in which the single-length window is applied to all RBs comprised in the channel, as illustrated in FIG. 12A.

FIG. 12B illustrates the level at which the size of the PSD radiated to the outside of the channel boundary is reduced if the long window is applied to eight RBs comprised in the left boundary and the right boundary of the channel and the short window is applied to 84 RBs comprised in the inner side of the channel A curve 1230 shows that the length of the window applied to all RBs comprised in the channel is 32. A curve 1240 indicates the PSD of the transmission signal if the length of the window applied to RBs comprised in the boundary side of the channel is 216 and the length of the window applied to RBs comprised in the inner side of the channel is 32. Unlike the case illustrated in FIG. 12A, if the long window is applied to the 8 RBs comprised in the boundary side of the channel, the size of the PSD radiated to the outside of the channel boundary may be reduced by 21 dB compared to the case in which the single-length window is applied to all RBs comprised in the channel, as illustrated in FIG. 12A. However, if a window longer than the CP is applied to the RBs comprised in the boundary side of the channel, the average SIR of the RBs comprised in the boundary side of the channel may be 39 dB.

FIGS. 12A and 12B show that, as the number of RBs comprised in the boundary side of the channel to which the long window is applied increases, the attenuation level of the PSD radiated to the outside of the channel boundary may be improved. However, as the number of RBs comprised in the boundary side of the channel to which the long window is applied increases, the transmission signal may be further distorted, and thus the SIR of the signal may be reduced. In other words, the SIR of the transmission signal and an interference control effect through the application of the long window have a trade-off relationship therebetween.

Figures 13A, 13B:
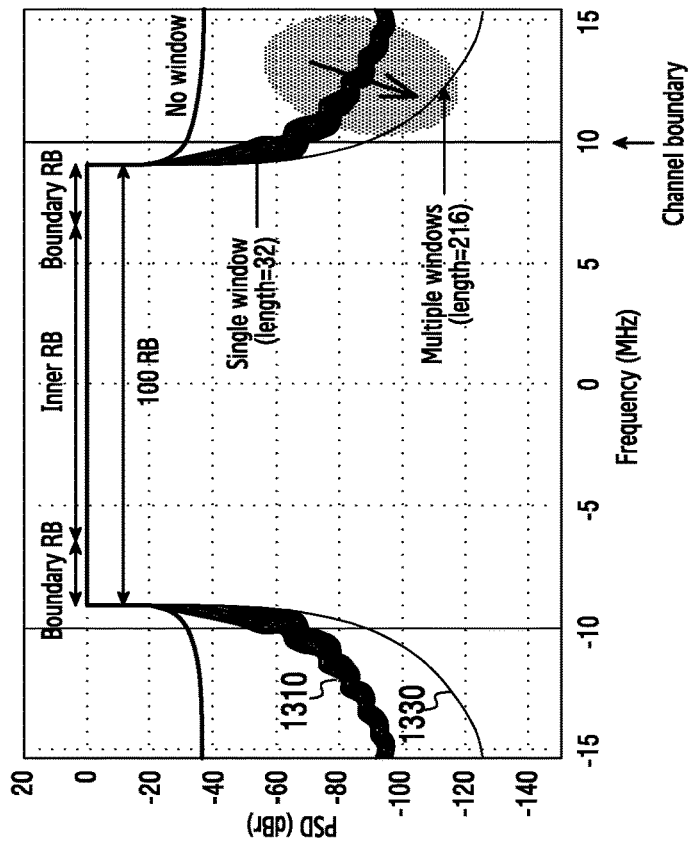
FIGS. 13A and 13B illustrate the relationship among the number of RBs on the boundary side to which the long window is applied, a Signal-to-Interference Ratio (SIR) of the RBs on the boundary side, and an attenuation level.

FIGS. 13A and 13B illustrate the relationship among the number of RBs on the boundary side to which the long window is applied, the Signal-to-Interference Ratio (SIR) of the RBs on the boundary side, and the attenuation level.

In the present embodiment, a window having a length of 216 is applied to RBs comprised in the boundary side of the channel and a window having a length of 32 is applied to RBs comprised in the inner side of the channel FIG. 13A shows PSDs in the case in which the window having the same length of 32 is applied to all RBs comprised in the channel (a curve 1310) and the case in which the window having the length of 216 is applied to RBs comprised in the boundary side of the channel and the window having the length of 32 is applied to RBs comprised in the inner side of the channel (a curve 1330). Since the length of the window applied to the RBs comprised in the boundary side of the channel is longer than the length of the CP, the symbol from a part corresponding to the RB comprised in the boundary side of the channel to the original symbol part may be distorted due to the application of the window, and thus the SIR of the signal may be reduced. However, if the long window is applied to RBs comprised in the boundary side of the channel, the attenuation level of the PSD radiated to the outside of the channel may be improved.

FIG. 13B is a table showing the relationship between the number of RBs comprised in the boundary side of the channel to which the long window is applied, the SIR of the signal, and the attenuation level of the PSD. According to the table of FIG. 13B, as the RBs comprised in the boundary side of the channel to which the long window is applied increases, the average SIR of the signal decreases but the attenuation level of the PSD of the signal increases outside the channel boundary. In other words, the improved attenuation level and the SIR of the signal that can be acquired through an increase in the number of RBs comprised in the boundary side of the channel to which the long window is applied have a compensatory relationship therebetween, and thus it is required to negotiate the attenuation level and the SIR of the signal by appropriately configuring multiple windows.

Figure 14:
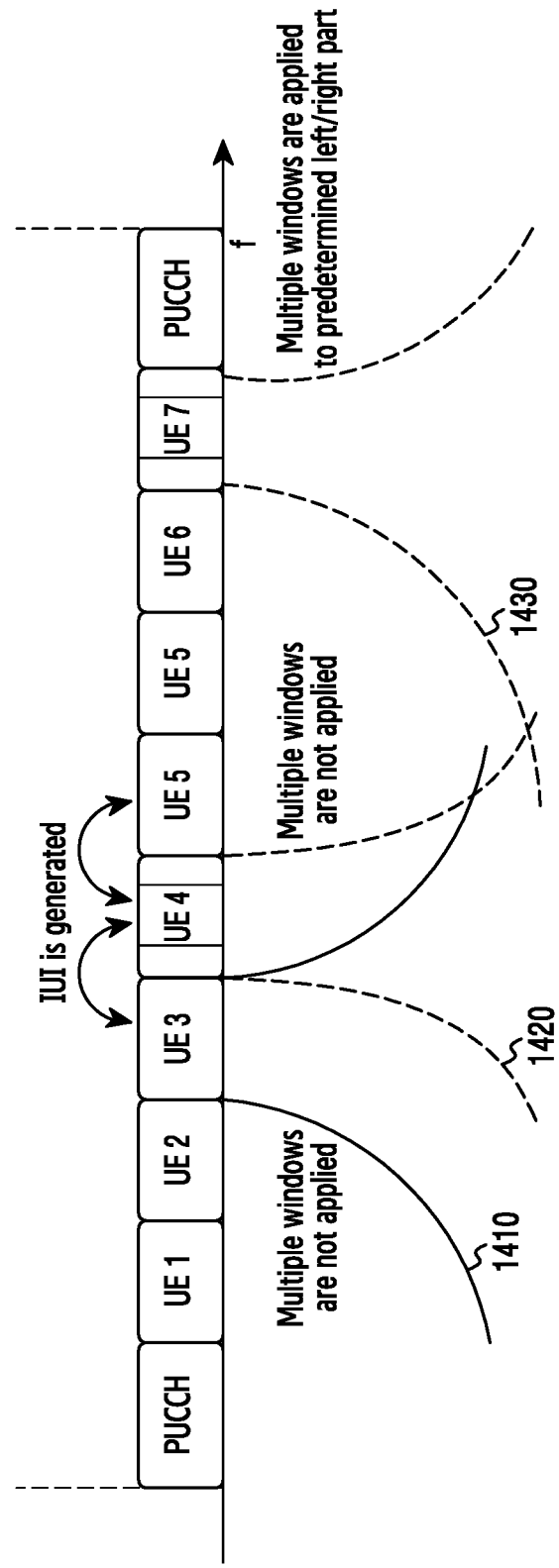
FIG. 14 illustrates a PSD of the signal transmitted by each UE if multiple windows are applied in the uplink of the wireless communication system.

FIG. 14 illustrates the PSD of the signal transmitted by each UE if multiple windows are applied in the uplink of the wireless communication system.

In the present embodiment, frequency resources for each of a plurality of UEs are adjacently allocated in all frequency bands. The width of all of the frequency bands occupied by each UE illustrated in FIG. 14 refers to the width of the frequency band or channel used by each UE. Each UE may transmit a signal or receive a signal through the allocated frequency band. UEs communicating with each other using adjacently allocated frequency resources may have interference generated therebetween.

A PSD 1410 and a PSD 1420 indicate PSDs of signals transmitted by UE 3 and UE 4. It is assumed that the PSD 1410 and the PSD 1420 are PSDs of signals to which the window is not applied. The PSD 1410 of UE 3 may be radiated to the outside of the frequency band allocated to UE 3 and thus influence the PSD 1420 of UE 4. The PSD 1410 radiated to the outside of the frequency band allocated to UE 3 may overlap the PSD 1420 of UE 4 and thus distort the PSD 1420. Conversely, the PSD 1420 radiated to the outside of the frequency band allocated to UE 4 may overlap the PSD 1410 of UE 3 and thus distort the PSD 1410. Accordingly, the signals transmitted or received by UE 3 and UE 4 adjacently allocated on the frequency bands may have interference generated therebetween. If the attenuation level of the PSD radiated to the outside of the frequency band allocated to the UE increases, the PSD of the UE overlaps the PSD of another UE and thus less influences the PSD, so that interference therebetween may be reduced.

It is assumed that the PSD 1430 is a PSD of a signal transmitted by UE 7, that is, a PSD of a signal to which multiple windows are applied. If the window is applied to the transmission signal, a rapid change in the signal can be prevented, so that a high-frequency component, among frequency components of the transmission signal, can be reduced. In other words, the size of the PSD of the transmission signal may become smaller in a frequency domain outside the frequency band allocated to the transmission signal. Application of the window to the transmission signal may mean distorting part of the transmission signal. Further, as the length of the applied window increases, a signal rate distorted in the transmission signal increases. However, it is possible to reduce the size of the PSD radiated to the outside of the channel boundary, for example, by applying the long window only to RBs comprised in the boundary side of the channel without applying the window to all RBs comprised in the frequency band allocated to the transmission signal. Accordingly, if multiple windows are applied to the transmission signal, distortion of the transmission signal can be reduced, and the attenuation level of the PSD radiated to the outside of the channel allocated to the transmission signal can be increased.

FIGS. 15A, 15B, and 15C schematically illustrate a proportion and a length of an applied window in a frequency spectrum of a signal transmitted by a UE.

FIG. 15A shows that a channel allocated to the UE is divided into a left boundary part, an inner part, and a right boundary part in order to apply multiple windows to a transmission signal. A bandwidth 1510 refers to the bandwidth of a channel allocated to the UE. If the channel is divided into three subbands, a band corresponding to the left boundary part of the channel refers to a band having a low frequency range, a band having an intermediate frequency range corresponding to the inner part of the channel, and a band having a high frequency range corresponding to the right boundary part of the channel.

FIG. 15B is a table showing proportions of the left boundary part band, the inner part band, and the right boundary part band, to which windows having different lengths are applied, in total channels allocated to the UE, and lengths of the windows applied to the respective bands. For example, if the left part, the inner part, and the right part of proportions of multiple windows are 10%, 70%, and 20%, the total channels are split such that the proportions of the left boundary part band, the inner part band, and the right boundary part band in the total channel allocated to the UE are 10%, 70%, and 20% and windows having lengths of 40, 32, and 32 are applied to RBs comprised in respective bands in FIG. 15B. Division of ranges of subbands to which windows having different lengths are applied in the frequency band allocated to the UE may be made through another method as well as the proportions of the multiple windows illustrated in FIG. 15B. For example, if an interval between subcarriers comprised in the transmission signal is uniform on the frequency axis, subbands to which windows having different lengths are applied may be divided by the number of subcarriers comprised in each subband instead of the proportions of the multiple windows.

FIG. 15C schematically shows that total frequency bands allocated to the UE are divided into left boundary part, right boundary part, and inner part bands and windows having different lengths are applied to the respective bands. Graphs illustrated in FIG. 15C indicate proportions of the left boundary part, the right boundary part, and the inner boundary part to which windows having different lengths are applied in the total frequency bands allocated to the UE, but does not mean a function having a particular purpose.

In FIGS. 15A, 15B, and 15C, the channel allocated to the UE is divided into subbands corresponding to the right boundary part, the inner part, and the left boundary part, and windows having different lengths are applied to the respective subbands. However, the division of the channel allocated to the UE into the three subbands corresponding to the right boundary part, the inner part, and the left boundary part is only an example, and the number of subbands into which division can be performed to apply windows having different lengths is not limited.

FIG. 16 is a table showing proportions of subbands to which windows are applied in the frequency band allocated to the UE and window lengths corresponding to the respective subbands.

In a table 1610, a proportion of each subband to which each of the windows having different lengths is applied in the frequency band allocated to the transmission signal in all frequency bands and the length of a window applied to each subband are mapped to indexes. In the table 1610, each index may be mapped to a specific window proportion and a specific window length. The table 1610 may be stored in, for example, a storage unit of the BS. The BS may determine the window configuration to be applied to the transmission signal transmitted by each UE such that interference between UEs allocated to adjacent frequency bands is minimized. According to various embodiments of the present disclosure, the window configuration may be referred to as a configuration of a window. The window configuration may comprise proportions of respective subbands to which windows having different lengths are applied in the frequency band allocated to the transmission signal of the UE in all frequency bands, in other words, proportions of multiple windows and information on lengths of the windows applied to the respective subbands. The BS may search for indexes mapped to the determined proportions of the multiple windows and window lengths in the table 1610 and transmit control information comprising the indexes to the UE. Further, the table 1610 may be stored in, for example, a storage unit of the UE. The UE may receive control information from the BS and determine proportions of multiple windows and window lengths mapped to the indexes comprised in the control information based on the table stored in the UE. The UE may transmit a signal to which the window is applied based on the determined proportions of the multiple windows and window length information.

A table 1630 comprises separate tables in which a proportion of each subband to which each of the windows having different lengths is applied in the frequency band allocated to the transmission signal in all frequency bands and a length of a window applied to each subband are mapped to separate indexes. The BS may determine the window configuration and transmit control information comprising indexes separately mapped to the determined proportions of multiple windows and window lengths to the UE, and the UE may acquire proportions of multiple windows and window length information to be applied to the transmission signal from the indexes comprised in the control information.

In the present disclosure, in order to configure multiple windows, ranges of subbands to which windows having different lengths are applied in the frequency band allocated to the transmission signal are indicated by proportions of the subbands for the frequency band of the transmission signal and window lengths to be applied to the respective subbands are indicated through a table, but a table for configuring multiple windows may be expressed through any of various methods. For example, the table may be expressed through the number of subcarriers comprised in the respective subbands to which windows having different lengths are applied instead of the proportions of the multiple windows. Further, in the table 1610 and the table 1630, the proportions of the multiple windows corresponding to the left boundary part, the inner part, and the right boundary part of the channel are only examples, and the tables may be expressed through a different method according to the number of subbands resulting from division of the frequency band allocated to the transmission signal according to the number of subbands.

Figure 17:
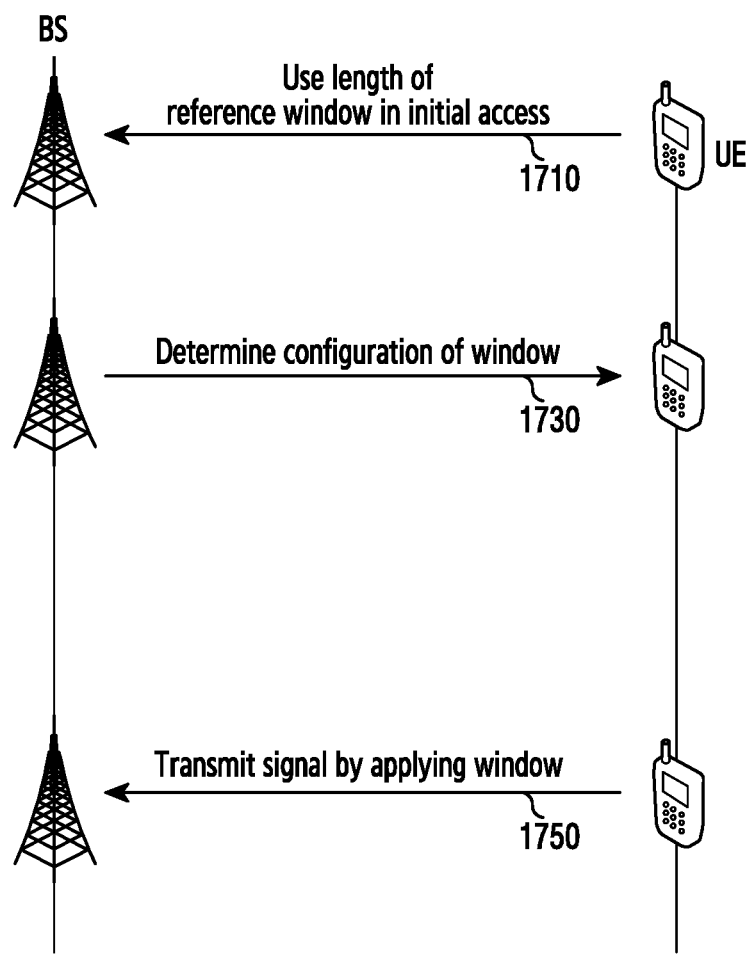
FIG. 17 is a signal flow diagram illustrating the operation in which the BS and the UE determine the window configuration to be used for each UE and apply the window.

FIG. 17 is a signal flow diagram illustrating the operation in which the BS and the UE determine the window configuration to be used for each UE and apply the window.

In step 1710, the UE transmits a signal to which a reference window is applied to the BS. The reference window may be, for example, a window having a single length applied to all frequency bands allocated to the signal transmitted by the UE. In other words, the UE applies the window having the single length to all transmission signals and transmits the transmission signals to the BS without consideration of interference between the UE and another UE allocated to an adjacent frequency band in step 1710.

In step 1730, the BS determines the window configuration from the signal transmitted by the UE and transmits control information comprising the determined window configuration to the UE. The window configuration may comprise, for example, proportions of subbands to which windows having different lengths are applied in the frequency band allocated to the transmission signal of the UE in all frequency bands, in other words, proportions of multiple windows and information on lengths of the windows applied to the respective subbands. The BS may use, for example, channel-related information in order to determine the window configuration. The channel-related information may comprise information on a maximum delay spread of the channel used by the UE, information on a Modulation-and-Coding Scheme (MCS) of the UE and an MCS of another UE allocated to an adjacent frequency band, and Channel Quality Information (CQI).

In order to determine the window configuration, the BS may use a frequency-selective characteristic of the channel or the maximum delay spread information of the channel. In the present disclosure, the term "frequency-selective characteristic" of the channel and the term "maximum delay spread of the channel" may have the same meaning That is, a large frequency selective characteristic of the channel means a large maximum delay spread of the channel. The maximum delay spread of the channel refers to the length of extension of a symbol if a symbol sequence of the transmission signal passes through the channel. If the length of the CP is longer than the maximum delay spread of the channel, a one-tap equalizer can be implemented without ISI or ICI. The length of effective CP is a length obtained by subtracting the window length from the total CP length. If the maximum delay spread of the channel is small, ISI and ICI may not be generated even though the length of the effective CP is short. In other words, if the maximum delay spread of the channel is small, ISI or ICI is not generated even though the UE applies the long window to the transmission signal, so that system performance can be guaranteed. However, if the maximum delay spread of the channel is large, ISI and ICI may not be generated only if a sufficiently effective CP length is guaranteed. In other words, if the maximum delay spread of the channel is large, the length of the window that can be applied to the transmission signal without deteriorating system performance may be relatively short. As described above, the BS should determine the window length in consideration of the maximum delay spread of the channel.

Further, for determining the window configuration, the BS may use information on an MCS level of the UE and information on an MCS level of another UE allocated to a frequency band adjacent to the UE. The MCS level indicates a modulation scheme and a coding scheme used if the UE transmits the signal. The modulation scheme may be, for example, one of Binary Phase-Shift Keying (BPSK), Quadrature Amplitude Shift Keying (QPSK), Quadrature Amplitude Modulation (QAM), and Binary Frequency-Shift Keying (BFSK). The coding scheme may be, for example, one of tail-biting and turbo-coding. For example, a Signal-to-Interference-plus-Noise Ratio (SINR) level required by each UE may vary depending on the modulation scheme used for a signal transmitted by each UE. In other words, the BS may inform of a reception signal power level of the UE based on the MCS level of the UE. An interference level at which the UE influences another UE may vary depending on reception signal power of the UEs adjacently allocated to frequency bands. Accordingly, the BS may determine the window configuration to be applied to the signal transmitted by each UE based on the MSC level information received from each UE.

In step 1750, the UE applies the window to the signal according to the window configuration comprised in control information received from the BS and transmits the signal to the BS. For example, the UE may divide the frequency band allocated to the UE into at least one subband according to the proportion of the window determined by the BS and apply the window having the window length determined by the BS to RBs comprised in each subband.

Figure 18:
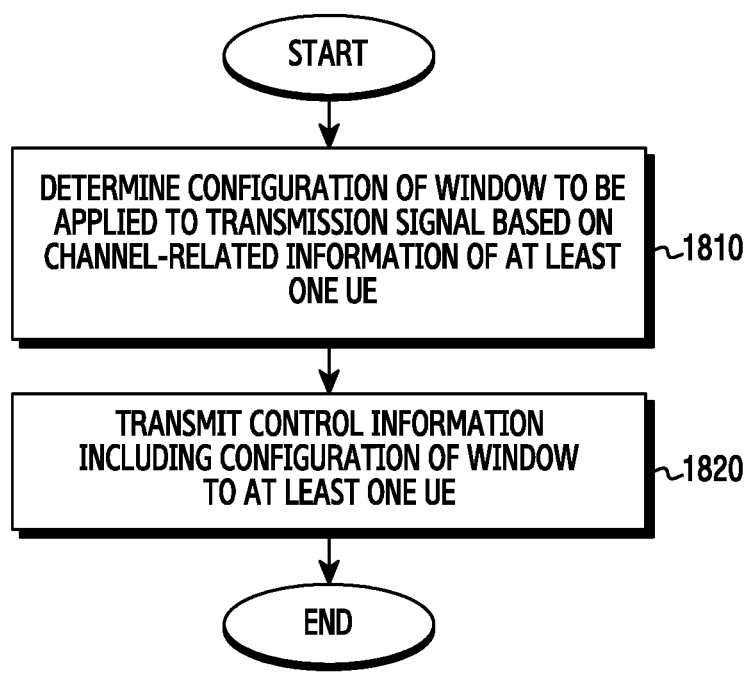
FIG. 18 is a flowchart illustrating the operation of the BS that determines the window configuration and transmits the determined window configuration to the UE.

FIG. 18 is a flowchart illustrating the operation of the BS that determines the window configuration and transmits the determined window configuration to the UE.

In step 1810, the BS determines the window configuration to be applied to the transmission signal based on channel-related information. The BS may receive a reference signal from at least one UE and measure a channel with at least one UE using the reference signal. The BS may acquire pieces of channel-related information for at least one UE based on the channel measurement result. The channel-related information may comprise information on a maximum delay spread of the channel used by the UE, information on a Modulation-and-Coding Scheme (MCS) of the UE and an MCS of another UE allocated to an adjacent frequency band, and Channel Quality Information (CQI). In the present embodiment, the entity that transmits the signal may be the UE communicating with the BS. The window configuration comprises lengths of windows to be applied to at least one subband resulting from division of the frequency band allocated to the transmission signal. That is, the window configuration comprises lengths of windows each of which is to be applied to each of at least one subband, wherein a frequency band allocated to the transmission signal may be divided into the at least one subband. Further, the window configuration may comprise at least one piece of information on a ratio of the length of at least one subband to the length of the frequency band allocated to the transmission signal or information on the number of subcarriers of the transmission signal comprised in at least one subband.

In step 1820, the BS transmits control information comprising the window configuration to at least one UE. The control information may comprise at least one index corresponding to the window configuration in a table stored in the BS. The UE may receive the control information comprising the window configuration from the BS, divide the frequency band allocated to the transmission signal into at least one subband according to the window configuration, and apply the window corresponding to the window length according to the window configuration to each subband.

Figure 19A:
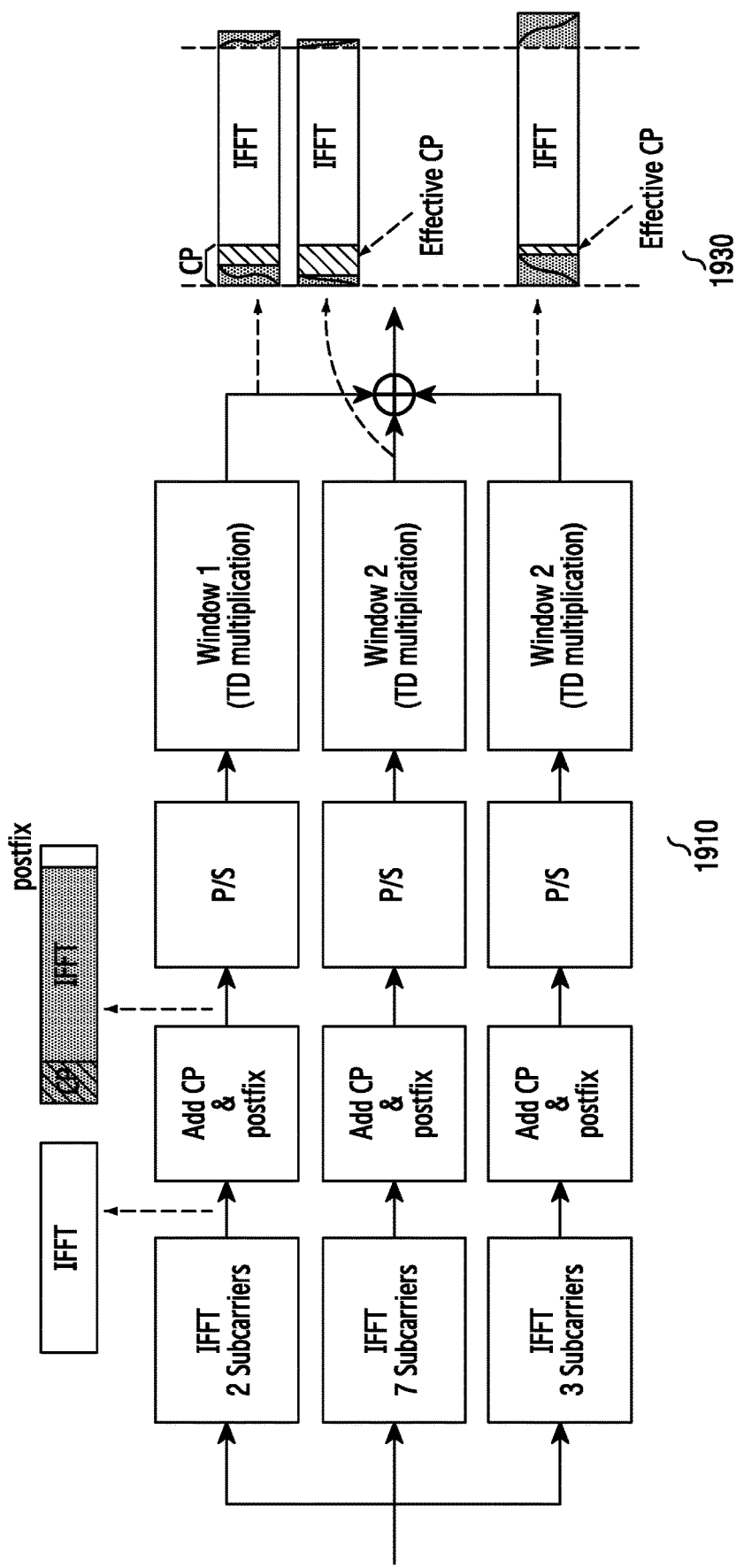
FIGS. 19A and 19B are block diagrams illustrating that windows having different lengths are applied to respective subcarrier groups allocated to the UE.
Figure 19B:
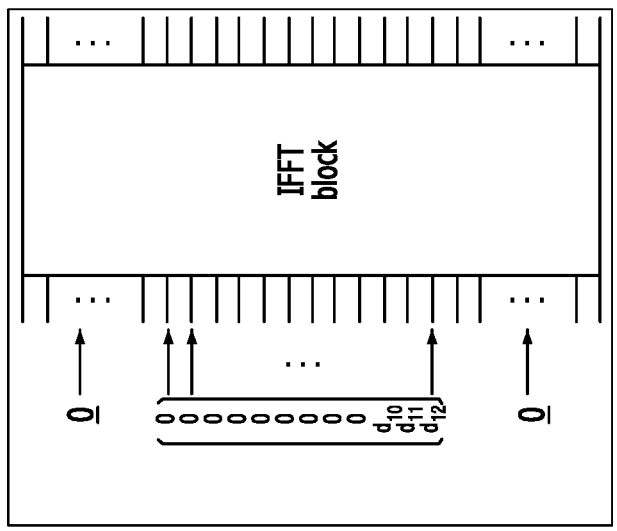
Figure 19B:
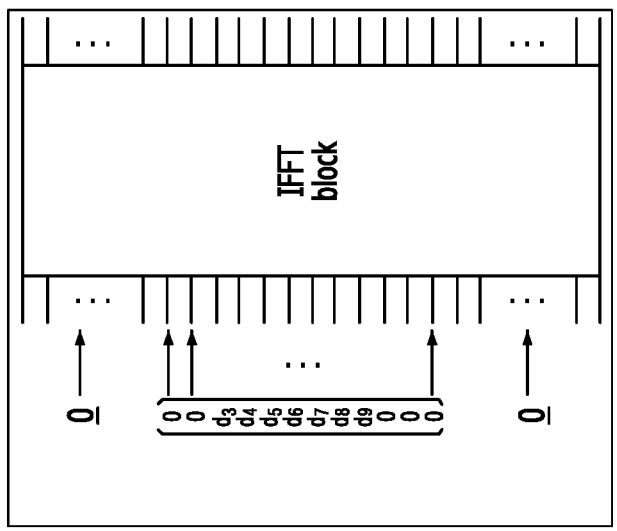
Figure 19B:
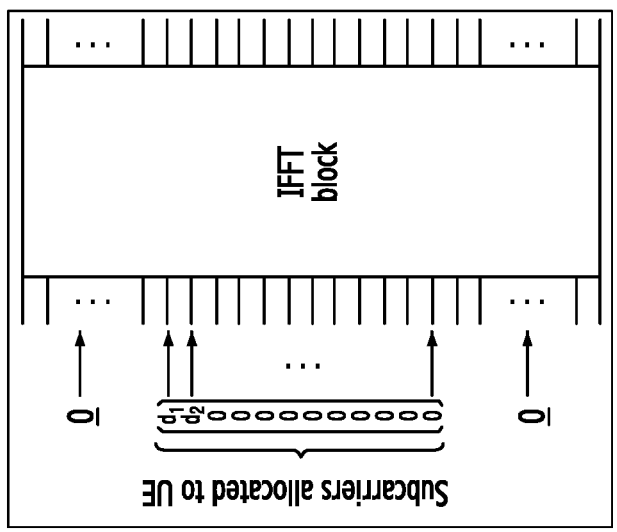

FIGS. 19A and 19B are block diagrams illustrating that windows having different lengths are applied to respective subcarrier groups allocated to the UE.

The UE receives control information comprising the window configuration from the BS and applies the window corresponding to the window configuration comprised in the control information to the transmission signal. In other words, the UE divides the frequency band allocated to the transmission signal into at least one subband according to the window configuration and applies the window corresponding to the window length according to the window configuration to each subband. FIG. 19A illustrates a detailed process in which the UE applies the window to the transmission signal. The UE divides the frequency band allocated to the transmission signal into at least one subband according to the window configuration. At least one subband may be divided, for example, according to the proportion of each subband in all frequency bands according to the proportion of the window comprised in the window configuration. According to the block diagram 1910, the UE performs an IFFT operation on each subcarrier comprised in each of the subbands resulting from the division. In other words, the UE performs Inverse Fast Fourier Transform (IFFT) on each subcarrier group comprised in each of at least one subband. In the block diagram 1910, the numbers of subcarriers input to respective IFFT blocks are 2, 7, and 3. In other words, if a frequency interval between subcarriers is the same, proportions of subband divided to apply different windows in all frequency bands may be 2/12, 7/12, and 3/12. However, the number of subcarriers input to each IFFT block is only an example, and the number of subcarriers in various combinations may be input to the IFFT block. The UE may acquire different symbol groups to which windows having different lengths are applied by applying the IFFT operation to each subcarrier group, perform pre-processing on each symbol group (for example, insert a cyclic prefix and a cyclic postfix into symbols belonging to each symbol group and perform parallel-to-serial conversion, as illustrated in the block diagram 1910), and then apply the windows to the transmission signal through multiplication of a window function having each window length to be applied to each subband. Reference numeral 1930 schematically indicates the application of windows having different lengths to respective symbol groups. As the windows having the different lengths are applied, effective CP lengths of symbols belonging to each symbol group may be different from each other.

In FIG. 19A, IFFT is performed in parallel using separate IFFT blocks for respective subcarrier groups to which windows having different lengths are applied, but the IFFT may be performed in series using one IFFT block. For example, the IFFT may be sequentially performed on the respective subcarrier groups, and window functions of different lengths may be sequentially multiplied by the symbol groups obtained based on the IFFT result.

FIG. 19B schematically illustrates a process of performing IFFT on each subcarrier group comprised in the transmission signal. In a block diagram 1950, it is assumed that the number of all subcarriers allocated to the UE is 12. The UE may divide all subcarriers allocated to the window configuration into subcarrier groups to which windows having different lengths are applied and perform IFFT on each of the subcarrier groups.

Figure 20:
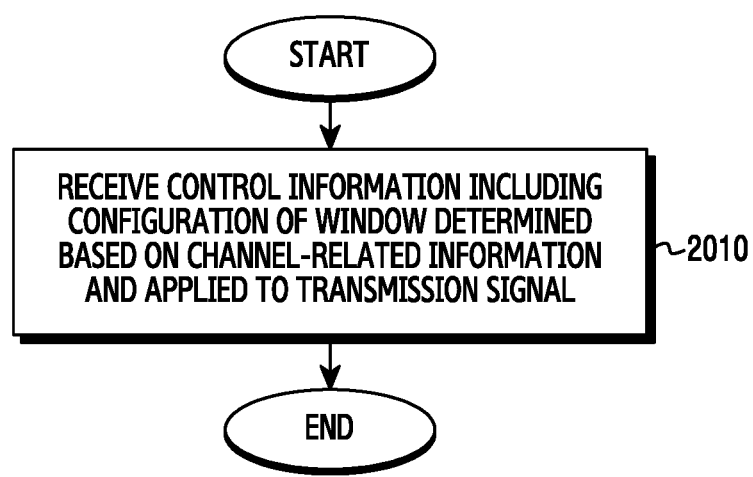
FIG. 20 is a flowchart in which the UE receives control information comprising the window configuration determined by the BS in order to apply the window.

FIG. 20 is a flowchart in which the UE receives control information comprising the window configuration determined by the BS in order to apply the window.

In step 2010, the UE receives control information comprising the window configuration applied to the transmission signal from the BS. The window configuration may be determined by, for example, the BS. The BS may acquire channel-related information by measuring a channel between the UE and the BS and determine the window configuration using the channel-related information. The channel-related information may comprise information on maximum delay spread of the channel used by the UE, information on a Modulation-and-Coding Scheme (MCS) of the UE and an MCS of another UE allocated to an adjacent frequency band, and Channel Quality Information (CQI).

Although not illustrated, the UE may apply the window to the transmission signal according to the window configuration comprised in the control information received from the BS. For example, the UE may divide the frequency band allocated to the transmission signal into at least one subband to which windows having different lengths are applied according to the window configuration. The UE may obtain symbol groups by performing Inverse Fast Fourier Transform (IFFT) on each subcarrier group comprised in each of at least one subband and apply the window to the transmission signal by multiplying each symbol group and the window function having each window length to be applied to each subband.

Figure 21:
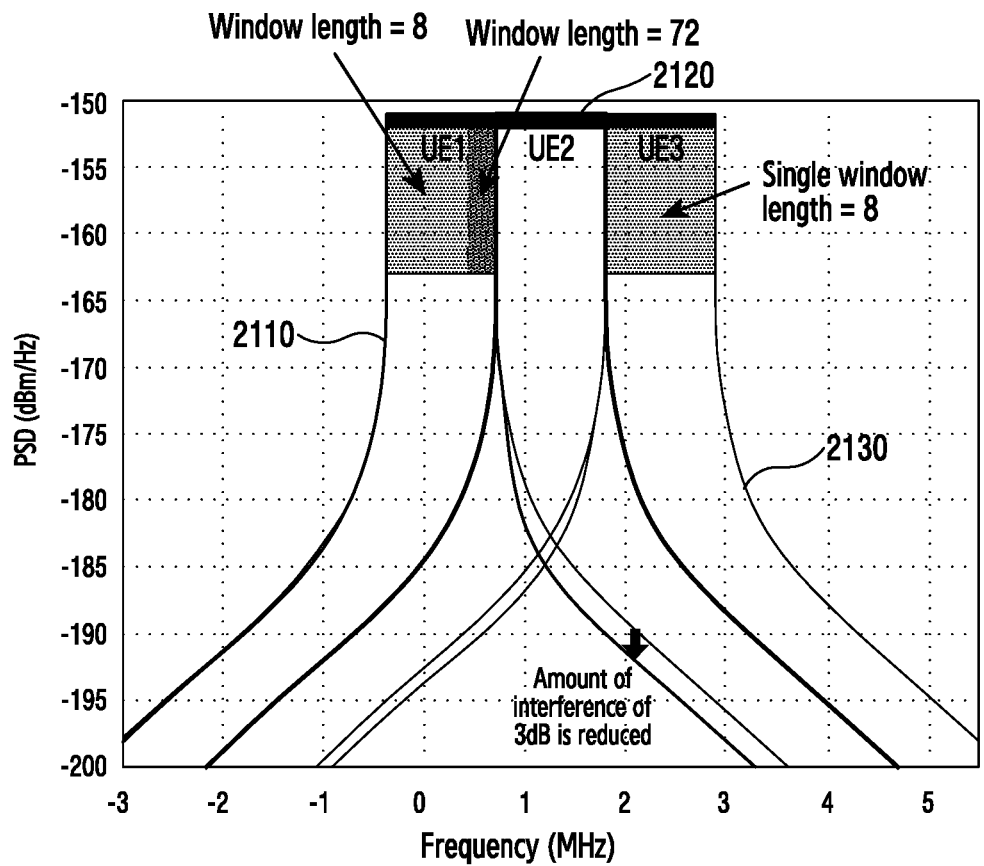
FIGS. 21, 22, and 23 illustrate a method of determining the window in consideration of reception signal power of UEs allocated to adjacent frequency bands.
Figure 22:
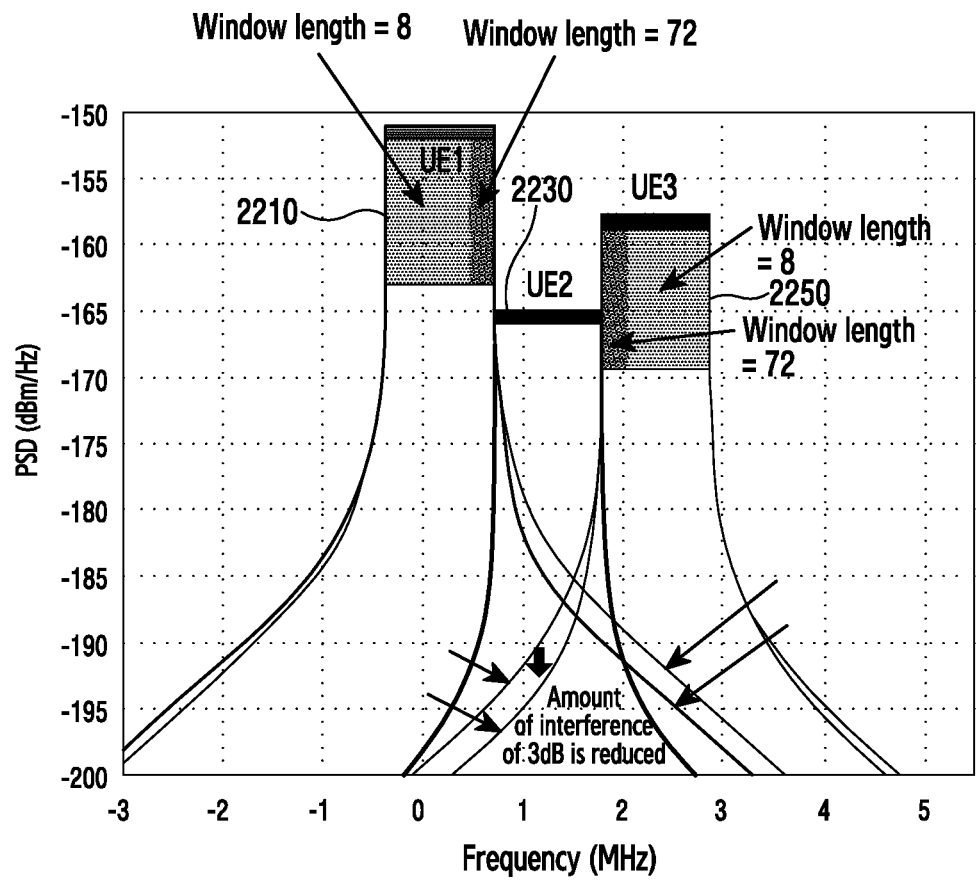
Figure 23:
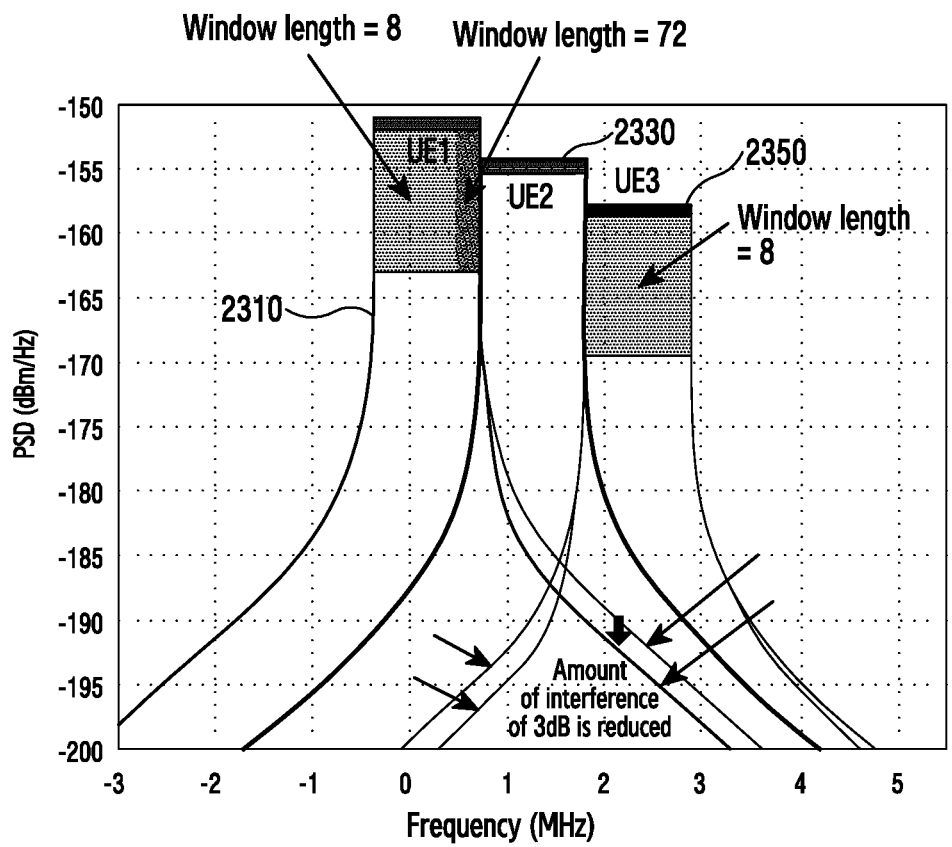

FIGS. 21, 22, and 23 illustrate methods of determining the window length in consideration of reception signal power levels of UEs allocated to adjacent frequency bands.

The BS may determine a reception signal power level based on MCS information of each UE transmitted by a plurality of UEs. For example, since an SINR level required by each UE is different according to the modulation scheme used for a signal transmitted by each UE, the BS may determine a reception signal power level of the UE from the MCS level of the UE. The reception signal power level of the UE may correspond to the PSD of the signal that the BS receives from the UE. In the present embodiment, the method by which the BS determines multiple windows to be applied to a first UE and a second UE in consideration of reception signal power levels of the first UE and the second UE allocated to adjacent frequency bands is described.

If the reception signal power level of the first UE is higher than the reception signal power level of the second UE, in other words, if the PSD of the first UE is larger than the PSD of the second UE, the influence of the size of the PSD of the first UE radiated to the outside of the frequency band, to which the first UE is allocated, on the PSD of the second UE may be relatively great. If the PSD of the first UE radiated to the outside of the frequency band allocated to the first UE overlaps the PSD of the second UE, the size of the overlapping PSD of the second UE may be very different from the size of the PSD before the overlapping. That is, if the reception signal power level of the first UE is higher than the reception signal power level of the second UE, the influence of the first UE on the second UE due to interference may be great. Conversely, even though the PSD of the second UE radiated to the outside of the frequency band allocated to the second UE overlaps the PSD of the second UE, the size of the overlapping PSD of the first UE may not be very different from the size of the PSD before the overlapping. That is, the influence of the second UE on the first UE due to interference may be relatively small. In order to reduce influence on the second UE due to interference, the first UE may apply, for example, a long window to a subband adjacent to the second UE in the frequency band allocated to the first UE. If the first UE applies the long window to the subband adjacent to the second UE in the frequency band allocated to the first UE, the size of the PSD of the first UE radiated to the frequency band allocated to the second UE may be reduced.

On the same principle, if the reception signal power level of the second UE is higher than the reception signal power level of the first UE, the influence of the second UE on the first UE due to interference may be great. In this case, in order to reduce influence on the first UE due to interference, the second UE may apply, for example, the long window to a subband adjacent to the first UE in the frequency band allocated to the second UE. If the second UE applies the long window to the subband adjacent to the first UE in the frequency band allocated to the second UE, the size of the PSD of the second UE radiated to the frequency band allocated to the first UE may be reduced.

If the reception signal power level of the first UE is similar to the reception signal power level of the second UE, in other words, if the PSD of the first UE is similar to the PSD of the second UE, the influence of the first UE and the second UE on each other due to interference may be similar. In this case, the BS may configure multiple windows to minimize the mutual influence due to interference between the first UE and the second UE in consideration of maximum delay spread of the channel of the first UE and the channel of the second UE.

FIG. 21 illustrates similar reception signal power levels of UE 1, UE 2, and UE 3 allocated to adjacent frequency bands. A PSD 2110, a PSD 2120, and a PSD 2130 correspond to UE 1, UE 2, and UE 3, respectively. In FIG. 21, since the influence of each UE on another UE due to interference is similar, the BS may configure multiple windows for each UE in consideration of the maximum delay spread of each UE. For example, if the maximum delay spread of the channel of UE 1 is small, the effective CP length required for preventing ISI and ICI is short. In other words, the long window may be used for UE 1, and the BS may determine the window configuration for UE 1 such that the long window is applied to the subband adjacent to the frequency band allocated to UE 2 in the frequency band allocated to UE 1 in order to reduce the influence of UE 1 on UE 2 due to interference. In another example, if the maximum delay spread of the channel of UE 3 is large, the effective CP length required for preventing ISI and ICI is long. In other words, since the long window cannot be used for UE 3, the BS may determine the window configuration for UE 3 such that a single short window is applied to the entire frequency band allocated to UE 3 in order to prevent performance deterioration of UE 3.

FIG. 22 illustrates different reception signal power levels of UE 1, UE 2, and UE 3 allocated to adjacent frequency bands according to an embodiment of the present disclosure. Specifically, the reception signal power of UE 1 is the highest, the reception signal power of UE 3 is next high, and the reception signal power of UE 2 is the lowest. A PSD 2210, a PSD 2220, and a PSD 2230 correspond to UE 1, UE 2, and UE 3, respectively. According to the present embodiment, the influence of UE 1 and UE 3 on UE 2 due to interference may be great. In this case, for example, the BS may determine the window configuration for UE 1 such that the long window is applied to the subband adjacent to the frequency band allocated to UE 2 in the frequency band allocated to UE 1 in order to reduce the influence of UE 1 on UE 2 due to interference. Further, the BS may determine the window configuration for UE 3 such that the long window is applied to the subband adjacent to the frequency band allocated to UE 2 in the frequency band allocated to UE 3 in order to reduce the influence of UE 3 on UE 2 due to interference.

FIG. 23 illustrates different reception signal power levels of UE 1, UE 2, and UE 3 allocated to adjacent frequency bands according to another embodiment of the present disclosure. Specifically, the reception signal power of UE 1 is the highest, the reception signal power of UE 2 is next high, and the reception signal power of UE 3 is the lowest. A PSD 2310, a PSD 2320, and a PSD 2330 correspond to UE 1, UE 2, and UE 3, respectively. According to the present embodiment, the influence of UE 1 on UE 2 due to interference is relatively great, but the influence of UE 3 on UE 2 due to interference may be relatively small. In this case, for example, the BS may determine the window configuration for UE 1 such that the long window is applied to the subband adjacent to the frequency band allocated to UE 2 in the frequency band allocated to UE 1 in order to reduce the influence of UE 1 on UE 2 due to interference. However, since the influence of UE 3 on UE 2 due to interference is relatively small, the BS may determine the window configuration such that a single long window is applied to, for example, the entire frequency band of UE 3 in order to improve the performance of UE 3 through an increase in the PSD attenuation level of UE 3.

In FIGS. 21 to 23, the lengths of windows applied to UE 1 and UE 3 are shown. However, the lengths of the applied windows are only examples, and the BS may configure windows having window lengths in various combinations for the respective UEs in consideration of maximum delay spread of the channel of each UE and relative influence of each UE on another UE due to interference.

In the present disclosure, the determination of the window configuration to be applied to each UE by the BS in consideration of the reception signal power level of each UE and the maximum delay spread of the channel is only an example. In other words, in the present disclosure, if the reception signal power levels of respective UE are similar, the BS determines lengths of windows in consideration of the maximum delay spread of the channel of each UE, but the BS may determine lengths of windows by independently considering the reception signal power level of each UE and the maximum delay spread of the channel.

In the above-described embodiments, in order to control interference between signals transmitted by UEs allocated to adjacent frequency bands in an uplink environment of the wireless communication system, the application of the window to the signal transmitted by the UE has been described. Hereinafter, a method by which the BS controls interference between signals transmitted through different radio access technologies in a downlink environment of the wireless communication system using different radio access technologies will be described.

Figure 24:
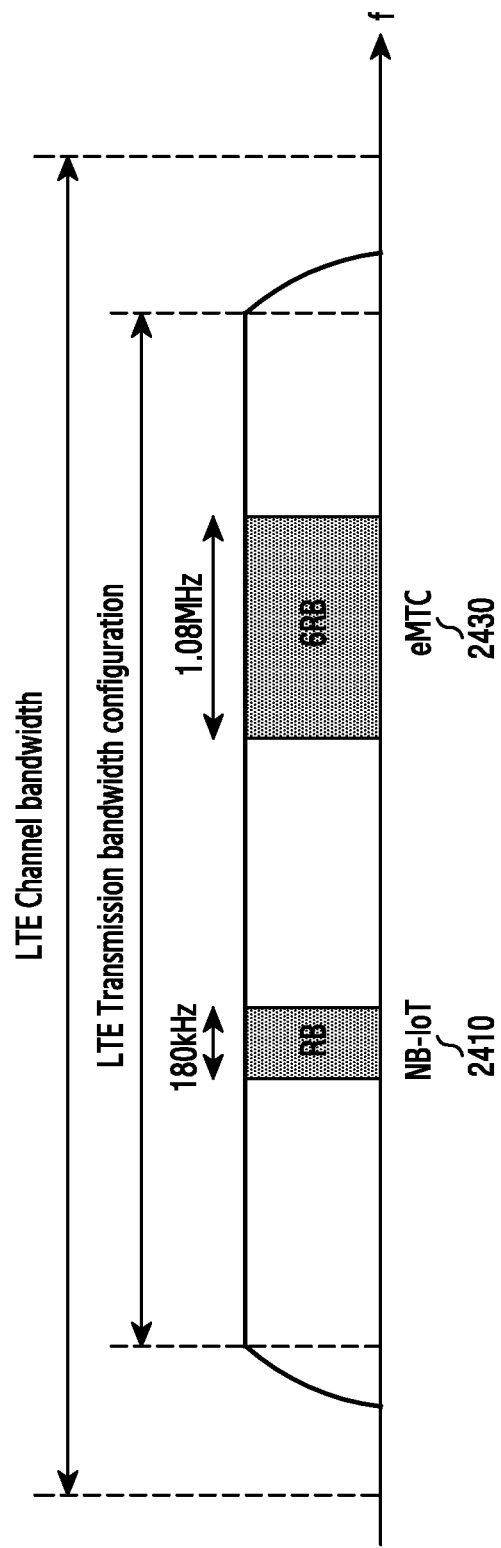
FIG. 24 illustrates bands allocated to different Radio Access Technologies (RATs) in Long-Term Evolution (LTE) transmission bands.

FIG. 24 illustrates bands allocated to different Radio Access Technologies (RATs) in Long-Term Evolution (LTE) transmission bands.

If transmitting a signal to the UE, the BS may transmit the signal to the UE through different radio access technologies. If the BS transmits a signal to the UE through different radio access technologies, the BS may transmit the signal using the frequency band to which each of the different radio access technologies is applied in all LTE transmission bands. The frequency band in which each of the different radio access technologies is used may be allocated to one LTE transmission band. For example, as illustrated in FIG. 21, a frequency band used by Narrow-Band Internet-of-Things (NB-IoT) 2410 of the different radio access technologies and a frequency band used by enhanced Machine-Type Communication (eMTC) 2430 may be allocated to one LTE transmission band. NB-IoT 2410 and eMTC 2430 have frequency bands of 180 kHz and 1.08 kHz in the LTE transmission bands, respectively. A system of NB-IoT 2410 may have a subcarrier interval different from that of LTE. If the BS transmits signals using OFDM systems having different subcarrier intervals, the transmitted signals may have interference generated therebetween. In other words, interference may be generated between signals transmitted through different radio access technologies, and thus controlling the interference between the signals transmitted through different radio access technologies is required.

Figure 25:
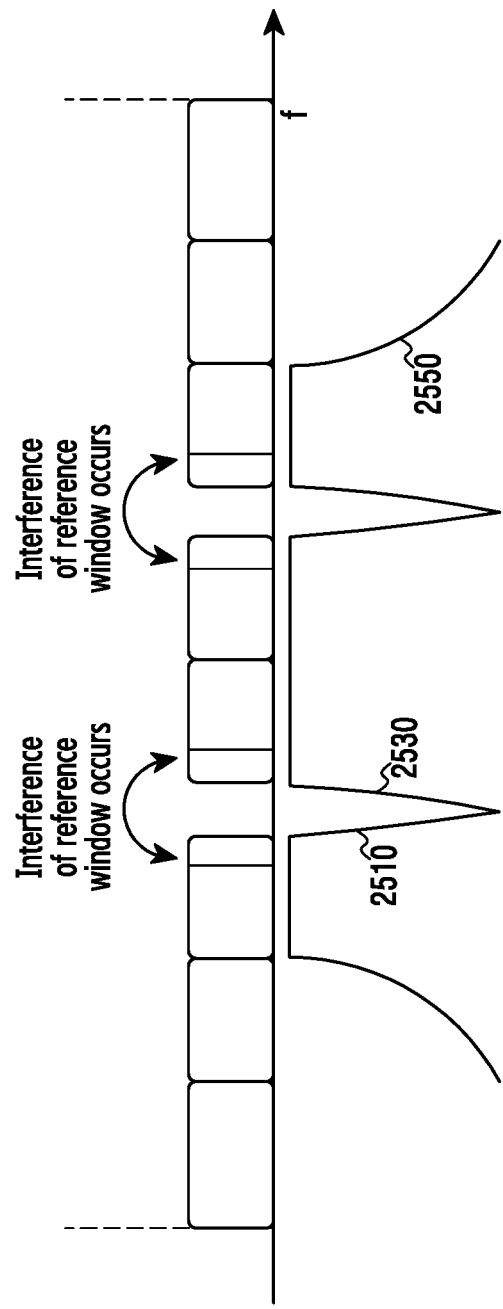
FIG. 25 illustrates the situation in which interference is generated between signals which the BS transmits through different radio access technologies in the downlink environment of the wireless communication system.

FIG. 25 illustrates the situation in which interference is generated between signals that the BS transmits through different radio access technologies in the downlink environment of the wireless communication system.

In the present embodiment, a PSD 2510, a PSD 2530, and a PSD 2550 are PSDs of transmission signals if a reference window is applied to signals transmitted through a first radio access technology, a second radio access technology, and a third radio access technology. The reference window may refer to, for example, a window having a single length applied to the entire frequency band allocated to each transmission signal without consideration of interference that may be generated between transmission signals. If the frequency bands used by the respective radio access technologies are adjacently allocated, interference may be generated between signals transmitted through the radio access technologies. For example, the PSD 2530 may be radiated to the outside of the frequency band allocated to the second radio access technology and thus overlap the PSD 2510. In other words, the signal transmitted through the second radio access technology may influence the signal transmitted through the first radio access technology due to interference. Similarly, the signal transmitted through each radio access technology may influence the signal transmitted through another radio access technology due to interference.

In order to control interference generated between different radio access technologies, multiple windows may be applied to the signals transmitted through the respective different radio access technologies. For example, in order to reduce the influence of the signal transmitted through the second radio access technology on the signal transmitted through the first radio access technology, the BS may apply the long window to a subcarrier of the transmission signal comprised in a subband adjacent to the frequency band allocated to the first radio access technology in the frequency band allocated to the second radio access technology. If the BS applies multiple windows to the signal transmitted through the second radio access technology, the influence of the signal transmitted through the second radio access technology on the signal transmitted through the first radio access technology due to interference may be reduced by increasing the attenuation level of the PSD 2530 radiated to the outside of the frequency band to which the first radio access technology is allocated. In other words, by applying multiple windows to signals transmitted through different radio access technologies, interference between the different radio access technologies can be controlled.

Figure 26:
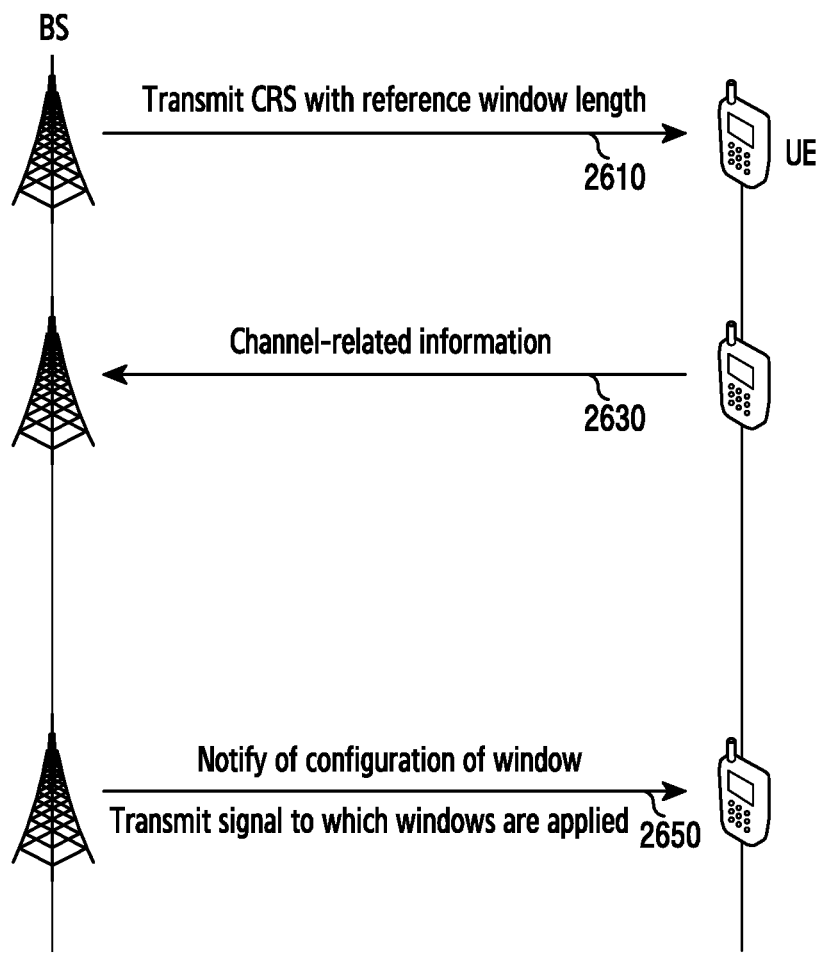
FIG. 26 is a signal flow diagram in which the BS determines the window configuration and applies the window to the transmission signal in the downlink environment of the wireless communication system.

FIG. 26 is a signal flow diagram in which the BS determines the window configuration and applies the window to the transmission signal in the downlink environment of the wireless communication system.

In step 2610, the BS transmits a Common Reference Signal (CRS) to which a reference window is applied to the UE. The UE may measure channels allocated to different radio access technologies using the reference signal and acquire channel-related information. The reference window may refer to, for example, a window having a single length applied to the entire frequency band allocated to each transmission signal without consideration of interference which may be generated between transmission signals.

In step 2630, the UE feed backs the channel-related information to the BS. The BS may determine the window configuration based on the fed back channel-related information. The channel-related information may comprise, for example, information on the maximum delay spread of the channel used by the UE, information on a Modulation-and-Coding Scheme (MCS) of the UE, and Channel Quality Information (CQI). The window configuration may comprise, for example, proportions of subbands to which windows having different lengths are applied in the frequency band allocated to the signal to be transmitted by the BS in all of the frequency bands, in other words, the proportions of multiple windows, and information on lengths of the windows applied to the respective subbands. The BS may determine the lengths of the windows to prevent ISI and ICI based on, for example, maximum delay spread information.

In step 2650, the BS notifies the UE of the window configuration and transmits the signal to which the window is applied. The window configuration of which the BS notifies the UE may be used to remove the window applied to the signal, for example, if the UE receives the signal to which the window is applied from the BS. The BS may divide the frequency band allocated to a specific radio access technology into at least one subband based on the proportions according to the window configuration and apply the windows having different lengths to subcarrier groups of the signal comprised in the respective subbands according to the window configuration.

Figure 27:
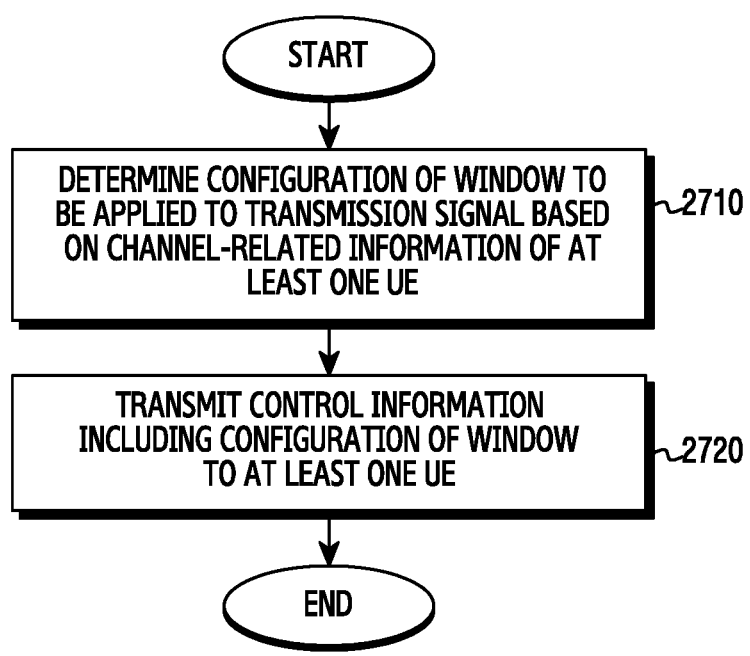
FIG. 27 is a flowchart illustrating the operation in which the BS determines the window configuration and applies the window to the transmission signal in the downlink environment of the wireless communication system.

FIG. 27 is a flowchart illustrating the operation in which the BS determines the window configuration and applies the window to the transmission signal in the downlink environment of the wireless communication system.

In step 2710, the BS determines the window configuration to be applied to the transmission signal based on channel-related information. The channel-related information may be determined by the channel measurement performed based on a CRS that the UE receives from the BS. The channel-related information may comprise information on the maximum delay spread of the channel used by the UE, information on a Modulation-and-Coding Scheme (MCS) of the UE, and Channel Quality Information (CQI). In the present embodiment, the entity that transmits the signal may be the BS that transmits the signal through different radio access technologies. The window configuration comprises lengths of windows to be applied to at least one subband resulting from division of the frequency band allocated to the transmission signal. Further, the window configuration may comprise at least one piece of information on a ratio of the length of at least one subband to the length of the frequency band allocated to the transmission signal or information on the number of subcarriers of the transmission signal comprised in at least one subband.

In step 2720, the BS transmits control information comprising the window configuration to at least one UE. The control information may comprise at least one index corresponding to the window configuration in a table stored in the BS. At least one index is for a UE acquiring configuration information of the window applied to the signal transmitted by the BS, and the UE may determine the window configuration corresponding to indexes based on the table stored in the UE. Upon receiving the signal to which the window is applied from the BS, the UE may use the window configuration comprised in control information received from the BS in order to remove the window applied to the signal.

Although not illustrated, the BS may apply the window according to the window configuration determined by the BS to the signal transmitted through a specific radio access technology. For example, the BS may divide the frequency band allocated to the specific radio access technology into at least one subband according to the configuration of the BS and apply the window corresponding to the window length to subcarriers comprised in respective subbands in the transmission signal according to the window configuration.

Figure 28:
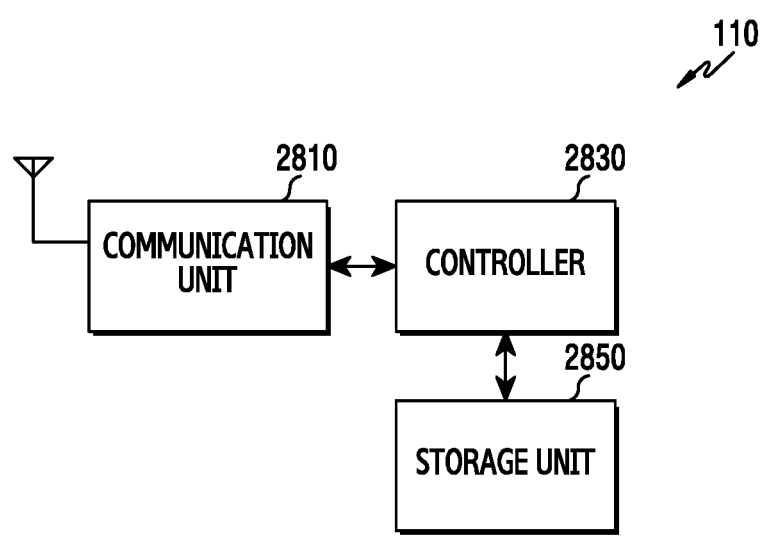
FIG. 28 is a block diagram illustrating the BS in the wireless communication system according to an embodiment of the present disclosure.

FIG. 28 is a block diagram illustrating the BS in the wireless communication system according to an embodiment of the present disclosure.

Referring to FIG. 28, the reception side 110 comprises a communication unit 2810, a controller 2830, and a storage unit 2850. In the present disclosure, the reception side may be the BS.

The communication unit 2810 performs functions for transmitting/receiving a signal through a wireless channel. The communication unit 2810 may comprise the transmission path 200 and the reception path 300. Further, the communication unit 2810 may comprise a transmission filter, a reception filter, an amplifier, a mixer, an oscillator, a DAC, and an ADC. In addition, the communication unit 2810 may comprise a plurality of Radio-Frequency (hereinafter, referred to as RF) chains. The communication unit 2810 may perform beamforming. For beamforming, the communication unit 2810 may control the phase and the magnitude of each of the signals transmitted through a plurality of antennas or antenna elements. Further, the communication unit 2810 may comprise a plurality of communication modules to support a plurality of different radio access technologies. The communication unit 2810 may apply the window to the transmission signal. In order to apply the window to the transmission signal, the communication unit 2810 may divide the frequency band allocated to the transmission signal into at least one band according to the window configuration determined by the controller 2830, perform IFFT on each subcarrier group of the transmission signal comprised in each subband, and multiply symbol values acquired from the IFFT result and the window function having the window length to be applied to each subband according to the window configuration, thereby applying the window to the transmission signal. The communication unit 2810 transmits and receives the signal as described above. Accordingly, the communication unit 2810 may be referred to as a transmitter, a receiver, or a transceiver.

The controller 2830 controls the overall operation of the reception side 110. For example, the controller 2830 transmits/receives the signal through the communication unit 2810. Further, the controller 2830 records data in the storage unit 2850 and reads the recorded data. To this end, the controller 2830 may comprise at least one processor. For example, the controller 2830 may comprise a CP for controlling communication and an AP for controlling a higher layer such as an application. According to an embodiment of the present disclosure, the controller 2830 may determine the window configuration to be applied to the transmission signal based on channel-related information. The window configuration may comprise the length of each window to be applied to each of at least one subband resulting from division of the frequency band of the transmission signal. Further, the window configuration may comprise information on proportions of respective subbands to which windows having different lengths are applied in the frequency band allocated to the transmission signal in all of the frequency bands or the number of subcarriers of the transmission signal comprised in the respective subbands.

The storage unit 2850 stores a basic program, an application program, and setting information for the operation of the reception side 110. Particularly, the storage unit 2850 may store data for signaling with the transmission side, in other words, data for analyzing a message from the transmission side. Further, the storage unit 2850 provides stored data in response to a request from the controller 2830. According to the present embodiment of the present disclosure, the storage unit 2850 may store a table indicating a combination of the configuration of a plurality of windows. The table may comprise, for example, indexes mapped to proportions of respective subbands to which windows having different lengths are applied in the frequency band allocated to the transmission signal and the lengths of the windows applied to the respective subbands. Further, the storage unit 2850 may configure and store separate tables by mapping the proportions of the respective subbands to which the windows having different lengths are applied in the frequency band allocated to the transmission signal in the entire frequency band and the lengths of the windows applied to the respective subbands to separate indexes. Further, the table comprises indexes mapped to the number of subcarriers comprised in the respective subbands to which windows having different lengths are applied in the frequency band of the transmission signal and the lengths of the windows to be applied to the respective subbands. If the BS determines the window configuration, the BS may determine indexes corresponding to the window configuration based on the table stored in the storage unit 2850 and transmit control information comprising the indexes to the UE.

Figure 29:
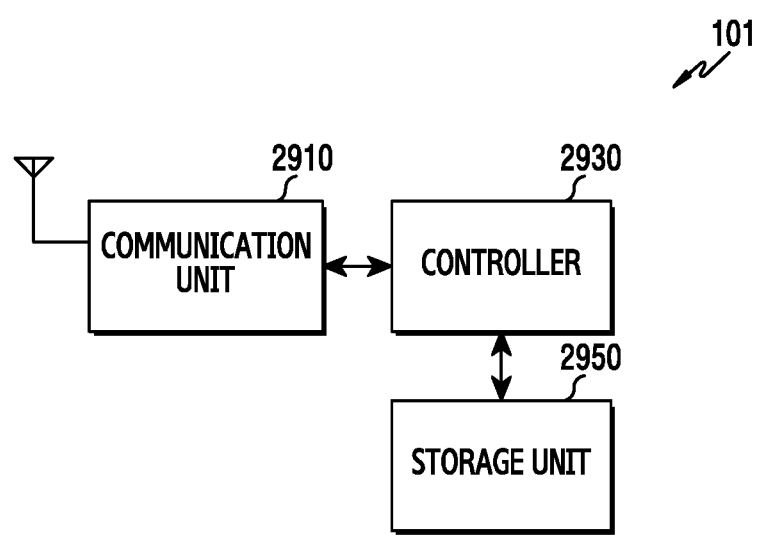
FIG. 29 is a block diagram illustrating the UE in the wireless communication system according to an embodiment of the present disclosure.

FIG. 29 is a block diagram illustrating the UE in the wireless communication system according to an embodiment of the present disclosure.

Referring to FIG. 29, the transmission side 101 comprises a communication unit 2910, a controller 2930, and a storage unit 2950. In the present disclosure, the transmission side may be the UE.

The communication unit 2910 performs functions for transmitting/receiving a signal through a wireless channel. The communication unit 2910 may comprise the transmission path 200 and the reception path 300. Further, the communication unit 2910 may comprise a transmission filter, a reception filter, an amplifier, a mixer, an oscillator, a DAC, and an ADC. In addition, the communication unit 2910 may comprise a plurality of Radio-Frequency (hereinafter, referred to as RF) chains. The communication unit 2910 may perform beamforming. For beamforming, the communication unit 2910 may control the phase and the magnitude of each of the signals transmitted through a plurality of antennas or antenna elements. Further, the communication unit 2910 may comprise a plurality of communication modules to support a plurality of different radio-access technologies. The communication unit 2810 may apply the window to the transmission signal. In order to apply the window to the transmission signal, the communication unit 2910 may divide the frequency band allocated to the transmission signal into at least one band according to the window configuration determined by the BS, perform IFFT on each subcarrier group of the transmission signal comprised in each subband, and multiply symbol values acquired from the IFFT result and the window function having the window length to be applied to each subband according to the window configuration, thereby applying the window to the transmission signal. The communication unit 2910 transmits and receives the signal as described above. Accordingly, the communication unit 2910 may be referred to as a transmitter, a receiver, or a transceiver.

The controller 2930 controls the overall operation of the transmission side 101. For example, the controller 2930 transmits/receives the signal through the communication unit 2910. Further, the controller 2930 records data in the storage unit 2950 and reads the recorded data. To this end, the controller 2930 may comprise at least one processor. For example, the controller 2930 may comprise a CP for controlling communication and an AP for controlling a higher layer such as an application program. The controller 2930 may determine the window configuration. For example, if the UE receives control information comprising indexes corresponding to the window configuration, the controller 2930 may determine the window configuration corresponding to the indexes based on the table pre-stored in the storage unit 2950.

The storage unit 2950 stores a basic program, an application program, and data such as setting information for the operation of the transmission side 101. Particularly, the storage unit 2950 may store data for signaling with the transmission side, in other words, data for analyzing a message from the transmission side. Further, the storage unit 2950 provides stored data in response to a request from the controller 2930. According to the present embodiment of the present embodiment, the storage unit 2950 may store a table indicating a combination of the configuration of a plurality of windows. The table may comprise, for example, indexes mapped to proportions of respective subbands to which windows having different lengths are applied in the frequency band allocated to the transmission signal and the lengths of the windows applied to the respective subbands. Further, the storage unit 2950 may configure and store separate tables by mapping the proportions of the respective subbands to which the windows having different lengths are applied in the frequency band allocated to the transmission signal in the entire frequency band and the lengths of the windows applied to the respective subbands to separate indexes. In addition, the table comprises indexes mapped to the number of subcarriers of the transmission signal comprised in the respective subbands to which windows having different lengths are applied in the frequency band allocated to the transmission signal and the lengths of the windows to be applied to the respective subbands.

Methods according to embodiments stated in claims and/or specifications of the present disclosure may be implemented in hardware, software, or a combination of hardware and software.

The software may be stored in a computer-readable storage medium. The computer-readable storage medium stores at least one program (software module) comprising instructions that causes, if executed by at least one processor in the electronic device, the electronic device to perform the method of the present disclosure.

The software may be stored in the form of a volatile or a non-volatile storage device such as a Read Only Memory (ROM), a memory such as a Random Access Memory (RAM), memory chips, devices or integrated circuits, or an optical or magnetic readable medium such as a Compact Disc-ROM (CD-ROM), Digital Versatile Discs (DVDs), a magnetic disk, or a magnetic tape.

A storage device and a storage medium corresponds to embodiments of a program comprising instructions for performing embodiments or a machine-readable storage means suitable for storing programs if executed. Embodiments provide a program comprising a code for implementing the device or the method claimed in one of the claims of the specification and a machine-readable storage medium for storing the program. Further, the programs may be electrically transferred to a medium, such as a communication signal transferred through a wired or a wireless connection, and embodiments properly comprise the equivalents.

In the above-described detailed embodiments of the present disclosure, a component comprised in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to specific embodiments thereof in the description of the present disclosure, it will be apparent that various changes and modifications may be made thereto without departing from the spirit and scope of the present disclosure. Therefore, the scope of the present disclosure should not be defined as being limited to the embodiments, but should be defined by the appended claims and equivalents thereof.

The invention claimed is:

1. A method for operating a base station (BS) in a wireless communication system, the method comprising:
  receiving, from a first user equipment (UE), at least one reference signal;
  determining a window configuration to be applied to a transmission signal of the first UE based on channel-related information of the first UE, wherein the channel-related information is obtained based on the at least one reference signal; and
  transmitting, to the first UE, control information comprising the window configuration,
  wherein the window configuration comprises a first window length to be applied to a first subband and a second window length to be applied to a second subband within a frequency band allocated to the first UE,
  wherein the second subband is adjacent to a frequency band allocated to a second UE, and wherein the second window length is set to be longer than the first window length based on a reception signal power of the first UE being larger than a reception signal power of the second UE.

2. The method of claim 1, wherein the channel-related information comprises information on a maximum delay spread of a channel between the BS and the first UE, information on a modulation-and-coding scheme (MCS) for the first UE and an MCS of the second UE allocated to the frequency band adjacent to the frequency band allocated to the first UE, and channel quality information (CQI).

3. The method of claim 1, further comprising:
applying inverse fast Fourier transform (IFFT) to each subcarrier group in each of at least one subband; and
multiplying symbol values acquired from a result of the IFFT and a window function with a length of each window to be applied to each of the at least one subband.

4. The method of claim 1, wherein the window configuration comprises at least one of:
information on a ratio of a length of each of at least one subband to a length of the frequency band; or
information on a number of subcarriers allocated to the transmission signal in each of the at least one subband.

5. The method of claim 1, wherein the first window length corresponds to a number of samples to which a first window is applied in a cyclic prefix of a symbol in the transmission signal.

6. The method of claim 1, wherein the first window length is determined based on a reception signal power of the first UE and a reception signal power of the second UE allocated to the frequency band adjacent to the frequency band allocated to the first UE.

7. A base station (BS) in a wireless communication system, the BS comprising:
a transceiver; and
at least one processor coupled to the transceiver and configured to:
receive, from a first user equipment (UE), at least one reference signal;
determine a window configuration to be applied to a transmission signal of the first UE based on channel-related information of the first UE, wherein the channel-related information is obtained based on the at least one reference signal; and
transmit, to the first UE, control information comprising the window configuration,
wherein the window configuration comprises a first window length to be applied to a first subband and a second window length to be applied to a second subband within a frequency band allocated to the first UE,
wherein the second subband is adjacent to a frequency band allocated to a second UE, and
wherein, in case that a reception signal power of the first UE is larger than a reception signal power of the second UE, the second window length is set to be longer than the first window length.

8. The BS of claim 7, wherein the channel-related information comprises information on a maximum delay spread of a channel between the BS and the first UE, information on a modulation-and-coding scheme (MCS) for the first UE and an MCS of the second UE allocated to the frequency band adjacent to the frequency band allocated to the first UE, and channel quality information (CQI).

9. The BS of claim 7, wherein the at least one processor is further configured to:
apply inverse fast Fourier transform (IFFT) to each subcarrier group in each of at least one subband; and
multiply symbol values acquired from a result of the IFFT and a window function with a length of each window to be applied to each of the at least one subband.

10. The BS of claim 7, wherein the window configuration comprises at least one of:
information on a ratio of a length of each of at least one subband to a length of the frequency band; or
information on a number of subcarriers allocated to the transmission signal in each of the at least one subband.

11. The BS of claim 7, wherein the first window length corresponds to a number of samples to which a first window is applied in a cyclic prefix of a symbol in the transmission signal.

12. The BS of claim 7, wherein the first window length is determined based on a reception signal power of the first UE and a reception signal power of the second UE allocated to the frequency band adjacent to the frequency band allocated to the first UE.

13. A first user equipment (UE) in a wireless communication system, the first UE comprising:
a transceiver; and
at least one processor coupled to the transceiver and configured to:
transmit, to a base station (BS), at least one reference signal, and
receive, from the BS, control information regarding a window configuration to be applied to a transmission signal of the first UE, the window configuration being determined based on channel-related information that is obtained at the BS based on the at least one reference signal,
wherein the window configuration comprises a first window length to be applied to a first subband and a second window length to be applied to a second subband within a frequency band allocated to the first UE,
wherein the second subband is adjacent to a frequency band allocated to a second UE, and
wherein, in case that a reception signal power of the first UE is larger than a reception signal power of the second UE, the second window length is longer than the first window length.

14. The UE of claim 13, wherein the channel-related information comprises information on a maximum delay spread of a channel between the BS and the first UE, information on a modulation-and-coding scheme (MCS) for the first UE and an MCS of the second UE allocated to the frequency band adjacent to the frequency band allocated to the first UE, and channel quality information (CQI).

15. The UE of claim 13, wherein the at least one processor is further configured to:
apply inverse fast Fourier transform (IFFT) to each subcarrier group in each of at least one subband; and
multiply symbol values acquired from a result of the IFFT and a window function with a length of each window to be applied to each of the at least one subband.

16. The UE of claim 13, wherein the window configuration comprises at least one of:
information on a ratio of a length of each of at least one subband to a length of the frequency band; or
information on a number of subcarriers allocated to the transmission signal in each of the at least one subband.

17. The UE of claim 13, wherein the first window length corresponds to a number of samples to which a first window is applied in a cyclic prefix of a symbol in the transmission signal.

18. The UE of claim 13, wherein the first window length is determined such that an effective CP length of a symbol in the transmission signal is longer than a maximum delay spread of a channel used by the first UE, and the effective CP length is a length obtained by subtracting the first window length from a length of CP of a symbol comprised in the transmission signal.

\* \* \* \* \*